(12) United States Patent
Patterson et al.

(10) Patent No.: US 7,970,670 B2
(45) Date of Patent: Jun. 28, 2011

(54) ELECTRONIC CREDIT DEFAULT FUTURES MARKET

(75) Inventors: David G. Patterson, Toronto (CA); Annie Theriault, Oakville (CA); John T. Rickard, Larkspur, CO (US)

(73) Assignee: Exchange Holdings Inc., Toronto (CA)

( * ) Notice: Subject to any disclaimer, the term of this patent is extended or adjusted under 35 U.S.C. 154(b) by 192 days.

(21) Appl. No.: 12/186,321

(22) Filed: Aug. 5, 2008

(65) Prior Publication Data

US 2010/0036757 A1  Feb. 11, 2010

(51) Int. Cl.
*G07B 17/00* (2006.01)
(52) U.S. Cl. ............. 705/30; 705/37; 705/36 R; 705/34
(58) Field of Classification Search ............... 705/36–37
See application file for complete search history.

(56) References Cited

U.S. PATENT DOCUMENTS

| | | | |
|---|---|---|---|
| 5,978,779 A * | 11/1999 | Stein et al. | 705/37 |
| 6,105,005 A * | 8/2000 | Fuhrer | 705/35 |
| 6,317,727 B1 | 11/2001 | May | |
| 7,246,093 B1 | 7/2007 | Katz | |
| 7,272,580 B2 | 9/2007 | Brady et al. | |
| 7,333,950 B2 | 2/2008 | Shidler et al. | |
| 7,467,112 B2 | 12/2008 | Frankel | |
| 7,533,054 B2 | 5/2009 | Hausman et al. | |
| 7,587,355 B2 | 9/2009 | Hirani et al. | |
| 7,702,563 B2 | 4/2010 | Balson et al. | |
| 2002/0147670 A1 | 10/2002 | Lange | |
| 2003/0028476 A1 | 2/2003 | Jenkins et al. | |
| 2003/0061148 A1 | 3/2003 | Alavian | |
| 2003/0236738 A1 * | 12/2003 | Lange et al. | 705/37 |
| 2005/0080734 A1 | 4/2005 | Lynch et al. | |
| 2005/0114256 A1 | 5/2005 | Booth et al. | |
| 2005/0149428 A1 | 7/2005 | Gooch et al. | |
| 2006/0106707 A1 | 5/2006 | Shetty et al. | |
| 2006/0224491 A1 * | 10/2006 | Pinkava | 705/37 |
| 2006/0253368 A1 | 11/2006 | O'Callahan et al. | |
| 2006/0253369 A1 | 11/2006 | O'Callahan | |
| 2006/0271452 A1 | 11/2006 | Sparaggis | |
| 2007/0083447 A1 | 4/2007 | Corcoran et al. | |
| 2007/0106583 A1 | 5/2007 | Hiatt et al. | |
| 2007/0162373 A1 | 7/2007 | Kongtcheu | |

(Continued)

FOREIGN PATENT DOCUMENTS

| WO | WO 01/088820 | 11/2001 |
|---|---|---|
| WO | 0219223 | 3/2002 |

OTHER PUBLICATIONS

JP Morgan, Corporate Quantitative Research, Credit Derivatives Handbook, Dec. 2006 (Parts 1 and 2).

(Continued)

*Primary Examiner* — Vanel Frenel
(74) *Attorney, Agent, or Firm* — Foley & Lardner LLP

(57) ABSTRACT

Systems and methods are provided for providing a credit default futures market. A system providing the credit default futures market includes a processor, memory and an interface. The interface is configured to display credit default futures contracts that subscribe to a set of standard terms and conditions. The processor is configured to settle certain credit futures contracts in kind and other in cash, depending on, at least in part, the maturity date of the futures contract. A method is presented for electronically clearing and settling probability of default futures contracts.

44 Claims, 13 Drawing Sheets

U.S. PATENT DOCUMENTS

| | | | |
|---|---|---|---|
| 2007/0239576 | A1 | 10/2007 | Hirani et al. |
| 2008/0010183 | A1 | 1/2008 | Holmes et al. |
| 2008/0033863 | A1 | 2/2008 | Simons et al. |
| 2008/0082436 | A1 | 4/2008 | Shalen et al. |
| 2008/0082437 | A1 | 4/2008 | Co et al. |
| 2008/0103961 | A1 | 5/2008 | Ramani et al. |
| 2008/0120249 | A1 | 5/2008 | Hiatt |
| 2008/0162373 | A1* | 7/2008 | Adler et al. ............... 705/36 R |
| 2008/0195519 | A1 | 8/2008 | Stevens |
| 2008/0195553 | A1* | 8/2008 | Umlauf ............... 705/36 R |
| 2008/0215430 | A1 | 9/2008 | Ellis et al. |
| 2009/0012892 | A1 | 1/2009 | Biase |
| 2009/0187504 | A1 | 7/2009 | Monaco |
| 2009/0210338 | A1 | 8/2009 | Hor et al. |
| 2010/0125517 | A1 | 5/2010 | Jacob et al. |
| 2010/0125518 | A1 | 5/2010 | Jaffrey |
| 2010/0153254 | A1 | 6/2010 | Shalen |
| 2010/0191639 | A1 | 7/2010 | Johnson et al. |
| 2010/0223175 | A1 | 9/2010 | Miglis et al. |
| 2010/0223201 | A1 | 9/2010 | Callaway et al. |
| 2010/0268665 | A1 | 10/2010 | Lutnick et al. |

OTHER PUBLICATIONS

Arora, Recovery Risk, Moody's Corporation & NYU Stern School of Business, 5th Annual Credit Risk Conference, May 15, 2008, 20 pages.

CME Group, Interest Rate Products, Eurodollar Futures, Eurodollar futures allow you to hedge fluctuations in short-term U.S. interest rates, 2009, 2 pages, CME Group Inc., Chicago.

CME Memo, Exhibit A and Attachments C, D, E, F, Jun. 5, 2007, 51 pages.

CME Memo, Exhibits B & C, Jan. 31, 2007, 52 pages.

Cookbook of CBOE Credit Event Binary Options (CEBO), Single-Name and Basket Options, 2007, 17 pages, Chicago Board Options Exchange, Incorporated.

International Monetary Fund: Global Financial Stability Report Containing Systemic Risks and Restoring Financial Soundness, Published Apr. 2008 [online], 211 pages, retrieved in Nov. 2009 at capitalism.net/Documents_files/imf%20report%202008.pdf.

International Search Report and Written Opinion for International Application No. PCT/US09/052711, mail date Feb. 23, 2010, 8 pages.

Introduction to CME Credit Event Futures, CME Credit Event Futures, page 10, 1 page total.

iTraxx, Eurex Credit Futures, 2007, 34 pages.

Rowan, Moody's Rating Methodology, Probability of Default Ratings and Loss Given Default Assessments for Non-Financial Speculative-Grade Corporate Obligors in the United States and Canada, Aug. 2006, 16 pages, Moody's Investors Service, Inc.

* cited by examiner

ELECTRONIC CREDIT DEFAULT FUTURES MARKET

BACKGROUND

1. Field of Invention

Aspects of the present inventions relate to methods and systems useful for electronic brokerage services and, more particularly, to methods and systems for providing an electronic market for futures contracts and associated instruments.

2. Discussion of Related Art

Buyers and sellers of various financial instruments currently transact business within a variety of established markets. Some of these established markets are traditional, brick and mortar exchanges with a trading floor, some are over the counter markets that operate using voice or electronic communication among trading desks and others are virtual, electronic exchanges. A particular example of an over the counter market is the current credit default swap (CDS) market.

A credit default swap is a contract between a buyer and a seller which shifts the financial risk that a reference entity may experience a credit default event from the buyer to the seller. In exchange for assuming this risk, the seller receives some form of consideration from the buyer, such as periodic cash payments. The seller's obligation in a CDS is triggered if the reference entity defaults on a credit obligation, such as by entering bankruptcy. While the CDS is the foundation of the over the counter credit derivatives market, this market includes many other financial instruments. Thus, the current over the counter credit derivatives market provides sundry instruments for executing financial tactics such as hedging and speculation.

SUMMARY

According to one embodiment, a method for exchanging credit futures contracts is provided. The method includes acts of receiving a first trade order requesting a long position on a probability of default futures contract (POD), the POD having a reference entity, a maturity date and a settlement value at the maturity date based at least in part on solvency of the reference entity, receiving a second trade order requesting a short position on the POD, matching the first trade order with the second trade order and recording, on a computer readable storage medium, a completed transaction, the completed transaction indicating the first trade order and the second trade order.

In the method, the act of receiving the first trade order may include an act of receiving the first trade order from a first party, and the method may further include an act of determining whether the first party has sufficient resources to meet a margin requirement for the position requested in the first trade order. Moreover, the act of receiving the first trade order may include an act of receiving the first trade order from a first party and the act of receiving the second trade order may include an act of receiving the second trade order from a second party. The method may further include an act of recording a clearing house as a counterparty to both the first party and the second party.

The method may further include an act of settling the POD to 0 when the reference entity is insolvent at the maturity date. Additionally, the method may include an act of settling the POD to face value when the reference entity is solvent at the maturity date. Moreover, the method may include an act of settling the POD in kind at a time prior to the maturity date. The act of settling the POD in kind may include an act of settling the POD in kind based at least in part on a comparison between the maturity date and an identified date. More particularly, the act of settling the POD in kind may include an act of settling the POD in kind when a difference between the maturity date and the identified date is 3 years.

In the method, the act of settling the POD in kind may also include settling the POD into a series of PODs, each of the series of PODs having a reference entity, a maturity date and a settlement value at the maturity date based at least in part on solvency of the reference entity, none of the series of PODs sharing a common maturity date. The act of settling the POD into the series of PODs may include an act of settling the POD into a series of PODs with each of the series of PODs having a quarterly maturity date. Further, the method may include an act of settling each of the series of PODs subsequent to one of the series of PODs when the one of the series of PODs settles to 0.

According to another embodiment, another method for exchanging futures contracts is provided. The method includes acts of recording, on a computer readable storage medium, a completed transaction including at least one first trade order, at least one second trade order and clearing the completed transaction using a clearing house. In the method, the act of recording may include an act of recording at least one first trade order that requests a long position on a series of futures contracts, each of the series of futures contact having at least one of reference entity and a settlement value at a maturity date, the settlement value at the maturity date being based at least in part on solvency of the at least one reference entity, none of the series of futures contracts sharing a common maturity date. Furthermore, the act of recording may include an act of recording at least one second trade order that requests a short position on the series of futures contracts.

In the method, the act of recording, on a computer readable storage medium, a completed transaction may include an act of recording at least one first trade order requesting a long position on a series of PODs. Furthermore, the act of recording, on a computer readable storage medium, a completed transaction may include an act of recording a long position on a series of probability of default index futures contracts. In addition, the act of recording, on a computer readable storage medium, a completed transaction may include an act of recording a long position on a series of probability of default index tranche futures contracts.

According to another embodiment, another method for exchanging futures contracts is provided. The method includes acts of receiving at least one first trade order requesting a long position on a futures contract, the futures contract having a binary reference event, a maturity date and a settlement value at the maturity date, the binary reference event having two possible outcomes and the settlement value at the maturity date being based at least in part on which of the two possible outcomes occurs with a time period ending at the maturity date, receiving at least one second trade order requesting a short position on the series of futures contracts, matching the at least one first trade order with the at least one second trade order and recording, on a computer readable storage medium, a completed transaction indicating the at least one first trade order and indicating the at least one second trade order. The method may further include an act of settling subsequent futures contracts of the series after one of the two possible outcomes occurs.

According to another embodiment, a computer readable medium comprising computer readable instructions that, as a result of being executed by a processor, instruct the processor to perform a method is provided. The method executed by the processor includes acts of receiving a first trade order requesting a long position on a probability of default futures contract (POD), the POD having a reference entity, a maturity date and a settlement value at the maturity date based at least in part on solvency of the reference entity, receiving a second trade order requesting a short position on the POD, matching the first trade order with the second trade order and recording, on a computer readable storage medium, a completed transaction, the completed transaction indicating the first trade order and the second trade order.

According to another embodiment, a system providing a credit futures contract exchange is provided. The system includes an order interface configured to receive trade requests for positions on a futures contract, the futures contact having at least one reference entity, a maturity date and a settlement value at the maturity date based at least in part on solvency of the at least one reference entity, a portion of the trade requests being offsetting trade requests, an auction engine configured to match the offsetting trade requests and store the offsetting trade requests as completed transactions and a settlement engine configured to settle at least a portion of the completed transactions. In the system, the futures contract may include at least one of a POD, a probability of default index futures contract and a probability of default index tranche futures contract.

According to another embodiment, a method for exchanging an index of credit futures contracts is provided. The method includes acts of receiving a first trade order requesting a long position on the index, the index having a settlement value based at least in part on a plurality of PODs, receiving a second trade order requesting a short position on the index, matching the first trade order with the second trade order and recording, on a computer readable storage medium, a completed transaction, the completed transaction indicating the first trade order and the second trade order.

The method may further include an act of settling the index in kind at a time prior to a maturity date of the index. In the method, the act of the index in kind comprises settling the index in kind based at least in part on a comparison between the maturity date and an identified date. Moreover, the act of settling the index in kind may include an act of settling the index in kind when a difference between the maturity date and the identified date is 3 years. Additionally, the act of settling the index in kind may include an act of settling the index into a series of index contracts, each of the series of index contracts having a settlement value based at least in part on a plurality of PODs, none of the series of index contracts sharing a common maturity date. Furthermore, the act of settling the index into the series of index contracts may include an act of settling the index into a series of index contracts, each of the series of index contracts having a quarterly maturity date. The method may also include an act of settling each of the series of index contracts subsequent to one of the series of index contracts when the one of the series of index contracts settles to 0.

According to another embodiment, a method for exchanging a tranche in an index of credit futures contracts is provided. The method includes acts of receiving a first trade order requesting a long position on the tranche, the tranche having a settlement value based at least in part on a settlement value of the index, receiving a second trade order requesting a short position on the tranche, matching the first trade order with the second trade order and recording, on a computer readable storage medium, a completed transaction, the completed transaction indicating the first trade order and the second trade order.

The method may further include an act of settling the tranche in kind at a time prior to a maturity date of the tranche. In the method, the act of settling the tranche in kind may include an act of settling the tranche in kind based at least in part on a comparison between the maturity date and an identified date. Further, the act of settling the tranche in kind may include an act of settling the tranche in kind when a difference between the maturity date and the identified date is 3 years. Additionally, the act of settling the tranche in kind may include an act of settling the tranche into a series of tranche contracts, each of the series of tranche contracts having a settlement value based at least in part on the settlement value of the index, none of the series of tranche contracts sharing a common maturity date. Moreover, the act of settling the tranche into the series of tranche contracts may include an act of settling the tranche into a series of tranche contracts, each of the series of tranche contracts having a quarterly maturity date. The method may also include an act of settling each of the series of tranche contracts subsequent to one of the series of tranche contracts when the one of the series of tranche contracts settles to 0.

According to another embodiment, another method for exchanging a series of futures contracts is provided. The method includes acts of receiving a first trade order requesting a long position on at least one of the series of futures contracts, the series of futures contracts having a duration substantially equivalent to a duration of a previously traded futures contract, each of the series of futures contracts having a maturity date, none of the series of futures contracts sharing a common maturity date, receiving a second trade order requesting a short position on the at least one of the series of futures contracts, matching the first trade order with the second trade order and recording, on a computer readable storage medium, a completed transaction, the completed transaction indicating the first trade order and the second trade order. In the method, the act of receiving a first trade order may include an act of receiving a first trade order requesting a long position on at least one of the series of futures contracts, each of the series of futures contracts having a quarterly maturity date.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1A:
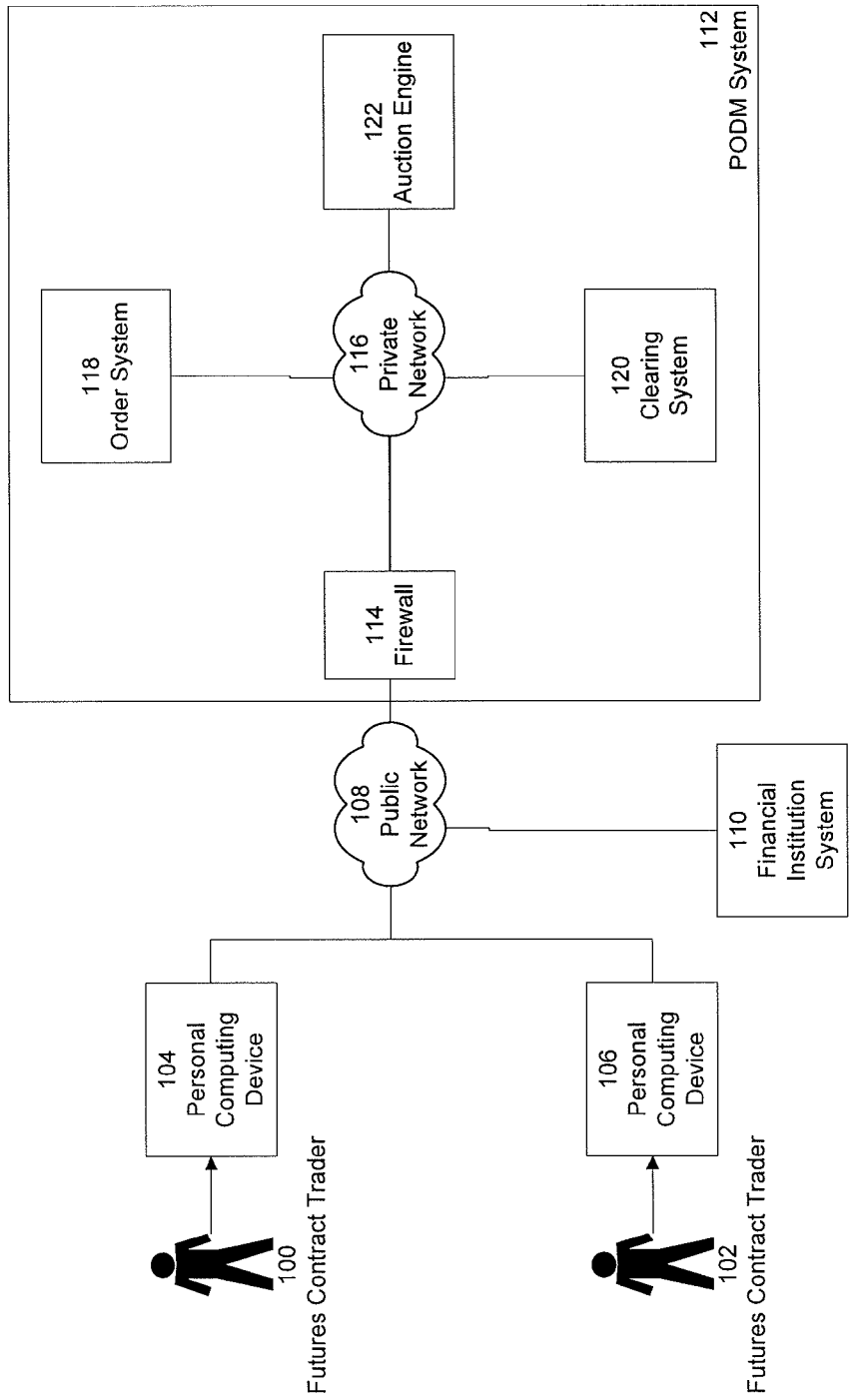
FIG. 1A is a block diagram of one example of a network environment that includes a PODM system.

As discussed below, aspects and embodiments disclosed herein provide for a probability of default futures contract market (PODM) system and methods that allow investors to trade credit based futures contracts. The formulation of useful systems and methods for managing these transactions is impacted by the unique manner in which a PODM system may be structured and organized. The credit based futures contracts may include probability of default futures contracts (PODs), which may be standardized in order to ease usage in a PODM system, and futures contracts derived from PODs, such as POD indexes and POD index tranches. Each of these credit futures contracts may have specialized attributes that may make each suited for one or more particular investment tactics, such as speculation or hedging, in the context of a system built for PODM.

According to certain aspects of the present invention, a facility is provided for trading of futures contracts with a settlement value based at least in part on a binary reference event. A binary reference event may be an event that is defined such that the event has only two potential outcomes. As one example, a binary reference event may be an event that occurs or does not occur within a specified time frame. More particularly, according to certain aspects of the present invention, a facility allowing for the trading of credit default futures is provided. Various inventions related to the provision of these services can address or permit a variety of advantages to allow trading these interests. For example, one embodiment provides for the trading of standardized PODs and other futures contracts based thereon. As is discussed further below, PODs allow market participants to financially express their views on the likelihood of default of a given reference entity over a specified period of time. Certain other embodiments are directed toward systems and methods for providing an electronic PODM system. A PODM system may use software and hardware to provide buyers and sellers of credit futures contracts a virtual exchange in which to transact trades. The PODM system may include methods and facilities to match trade requests, monitor investor positions and report information related to those positions to interested entities. The PODM may also include a clearing house function that provides a well established counterparty to market participants.

For instance, the PODM system may provide an order request interface to both buyers and sellers. This order interface may be used by the buyers and sellers to post trade requests on the PODM system. The PODM system may match offsetting order requests and consummate transactions based on the matched orders. Additionally, the PODM system may provide a facility for a market maker to provide bids and offers in the market, thereby enhancing liquidity for other market participants. Also, a clearing house function may insert a clearing house as the buyer to every seller and as the seller to every buyer. Consequently, in regards to clearing and settlement, both of the original parties to the contract may be, in fact, dealing with the central counterparty, with consideration and performance flowing appropriately between all three parties according to the rights and obligations of the contract.

Furthermore, the PODM system may maintain near real-time indications of the current trading prices, such as bid prices and ask prices, of various instruments, such as PODs, options and indexes. The PODM system may also maintain an accounting of investor positions and may report this accounting through various interfaces to external entities, such as users or other systems, or may take other actions depending upon the PODM system configuration. For instance, the PODM system may expose user and system interfaces to summarized market data. This market data may include trading volumes, futures contract prices and the market's view on the probability of default of various reference entities. This information may be provided to external entities, by the administrator of the PODM system, in exchange for a fee.

The aspects disclosed herein, which are in accord with the present invention, are not limited in their application to the details of construction and the arrangement of components set forth in the following description or illustrated in the drawings. These aspects are capable of assuming other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items.

Standard Form of Probability of Default Futures Contracts

According to one embodiment of the present inventions, a standard form of contract may be provided for specification of a credit default futures contract. One example of certain terms for a credit default futures contract and a POD is explained with reference to Table 1.

TABLE 1

| Contract Description |
| --- |
| $1,000,000 in face value of default exposure on a specific corporate, government, institutional or financial entity (reference entity) for a specific period. |
| Contract Name |
| "[Entity name] probability of default (POD) futures" |

TABLE 1-continued

Pricing Mechanism

Prices will be quoted on the futures exchange as (100 − (POD × 100)) to two decimal places where POD is the probability of default as determined by the market for the period specified. The POD will be a number from 0 to 1 inclusive. Since the contract size is $1,000,000 the price will be multiplied by $10,000 to obtain the value of the contract.

Tick Size

Minimum price fluctuations will be .01. A tick of .01 will represent $100 of value.

Multiplier

$10,000

Contracts Listed

Quarterly contracts for three years: March, June, September, December; and annual contracts for 7 additional years: December

Last Trading Day

For quarterly contracts: The last business day of the settlement month prior to the $21^{st}$ day of that month.
For annual contracts: The last business day prior to the $21^{st}$ day of December in the year three years before the contract year

Settlement Day

The second business day after the $21^{st}$ day of the settlement month which may be postponed until the Exchange is satisfied of the state of the reference entity at close of trade of the contract.

Trading Hours

Electronic Trading from 6:30 pm to 4:00 pm (New York time) time Sunday to Friday. For expiring contracts last trade on the last trading day will be at 12:00 noon (New York time).

Settlement Procedure

Cash settlement for the Quarterly Contracts will reflect the state of the reference entity as of noon New York time on the last trading day. If it is determined that the reference entity is either;
a) bankrupt or
b) insolvent as evidenced by the failure to pay principal payments due on loans or bonds and which payment requirements are beyond their contractual cure period by noon on the last trading day,
the entity will be declared to be in default.
The Exchange will post on its website the determined settlement state by noon of the first business day after the $21^{st}$ day of the settlement month. Any evidence to the contrary must be presented to the Exchange by 4 pm on the first business day after the $21^{st}$ day of the settlement month. The determination of the exchange is final. If the state is indeterminate the exchange may delay final settlement until determination is finalized.
If the insured entity is declared in default the settlement price will be zero (0). If the insured entity is declared not in default the settlement price will be one hundred (100). The contract will be cash settled to these prices.

Early Settlement:

All later contracts in any series of contracts will immediately settle at 100 if any early contract in the series settles at zero.

Settlement Procedure for Annual Contracts:

Annual contracts will settle on the delivery date with three years to final maturity. They will settle in kind, with both long and short positions delivering four quarterly equivalent contracts each at the following function of the last traded price of the annual contract in question. Each quarterly contract will initially be priced at P = (price of annual contract − 100) ÷ 4) + 100.

In this example, the contract is for a credit default future in an individual credit contract, denoted as "[Entity name]" which corresponds to the entity for which a default contract is purchased. In this example, the face value is the monetary value of the settlement in the event that the entity referred in the contract does not suffer a default event (bankruptcy or insolvency) in the specified time period. In this example, the face value of the contract is $1,000,000, and in this particular example, the face value of each contract monitored for exchange by a PODM system, is the same.

In alternative embodiments, the face values may be constrained to a limited number of potential face values, e.g., two or three (although other embodiments may have more or unlimited possibilities). By constraining the face value of the contract (or other terms of the contract) to a fixed number of possibilities, the ability to establish a uniform, automated exchange facility is promoted. In other embodiments, the exchange may be structured by fixing aspects of the contract other than the face value of the return.

In this example, another contract term that is constrained is the period for which a futures contract is made. In this example, the face value is fixed at $1,000,000 for specific periods of time (which are constrained in this example to quarterly contracts for the first three years and annual contracts for an additional seven years). If at the end of the first specified period no default has occurred, the long receives and the short position pays a settlement based on the face value of the futures contract. On the other hand, if a default does occur in the specified time period, then the long pays and the short receives a settlement based on a value of zero. In this example, as indicated in "early settlement," if a default occurs in advance of the specified time period for a particular contract belonging to a particular series, an early settlement is triggered on these later contracts where the long position receives and the short pays a settlement based on the face value of those later contracts. In this embodiment, the risk associated with short term default is separated from the risk associated with a default in the longer term (assuming there is no short-term default). Thus, with this embodiment, tightness in the short term credit market may not spill over to the same degree to the long term credit market.

In other embodiments, an earlier default could result in no return on the contract. Also, other embodiments may manifest different relationships between defaults and obligations to pay. For example, in one embodiment, payment of the face value of the contract may be obliged when a reference entity defaults within a specified time period. In another embodiment, payment of the face value of the contract may be obliged when a reference entity defaults in a particular manner (for example, filing for bankruptcy) within a specified time period.

In other embodiments, payments may be based on events other than default and, depending on the nature of the possibility of multiple occurrences of these events, may or may not have a similar "early settlement" provision for later contracts. More specifically, embodiments in accord with the present invention may provide for contracts valued by occurrence or non-occurrence of a single occurrence event, i.e. a binary reference event, and may provide for similar "early settlement" of particular single occurrence futures contracts.

Other time periods for the futures contracts may be fixed and the face value could either be the same, or different, for different time periods. For example, a POD could be limited only to quarterly, to quarterly for some time frames and annual for others (as in the example illustrated in Table 1), or may permit quarterly and annual (or other time frame) contracts to be placed at any particular time through the PODM.

In one embodiment, the probability of default associated with these contracts is determined by the market based on the trading price for the particular POD, and the price of the contracts is set accordingly. In this example, the pricing mechanism used by the market for these contracts may be (100−(POD×100)) to two decimal places, where POD is the probability of default as determined by the market for the period specified. In this example, the multiplier is $10,000 and the tick size is 0.01. Changes in contract prices may be cleared and settled daily. Thus, the profit or loss that a trader incurs on a given day of trading is based upon the change in the market's perception of the POD at the end of that day. For example, if the $POD_p$ at the end of the previous trading day was 8% and the $POD_c$ at the end of the current trading day is 10% the amount of money lost by the long position (and the amount of money gained by the short position) on a $1,000,000 face value contract would be $20,000 as shown by the following calculations:

$$\$10,000 \times \left( \frac{100-}{(POD_c \times 100)} \right) = \$10,000 \times (100 - (.10 \times 100)) = \$900,000$$

$$\$10,000 \times \left( \frac{100-}{(POD_c \times 100)} \right) = \$10,000 \times (100 - (.08 \times 100)) = \underline{\$920,000}$$

$$(\$20,000)$$

In this embodiment, price at contract maturity may be determined in the same manner. For example, at maturity the POD is either 1 or 0. Thus, where POD=0 the settlement price of the contract would be:

$$\$10,000 \times (100-(0 \times 100)) = \$1,000,000$$

Similarly, were the POD=1, the settlement price of the contract would be 0. Thus, the amount of money gained or lost on the maturity date would be the difference between the contract price at the end of the previous day multiplied by $10,000 and either the face value of the contract or zero.

Since POD is determined by the market, in this example, in establishing the price of a contract with a face settlement return of $1,000,000, rather than expressly agreed upon as such or set by an external entity, different entities in the market may arrive at different estimates of POD and, therefore, wish to enter into or exchange a credit default contract for this reason (of course, other reasons may exist for motivating a sale or purchase). Additionally, other models may be applied for determining price, e.g., the model above was linear and nonlinear models may be applied. Moreover, other factors (such as time value of money, tolerance to risk or currently held assets/positions) may be reflected in a trader determining a price point at which they are willing to enter the market.

The tick size, or smallest unit of increasing or decreasing the change of the price of a particular contract, in this example, is 0.01 and therefore corresponds to $100. Establishing a tick size can assist in facilitating the setting of prices and trading of interests.

In this example, there is a fixed time for permitting trading of futures contracts and a fixed time and mechanism identified for establishing whether a default has occurred, as illustrated in Table 1. This permits orderly trading and administration of futures contracts and settlement of futures contracts.

As described above, in this example and for quarterly contracts, if there is no default in the time period specified in a futures contract, the settlement is in cash and returns the face amount of the contract (e.g., 100 times the multiplier of $10,000 which is $1,000,000). If there is a default, the return is zero.

In this example, annual contracts may also be purchased for time periods more than three years out. These contracts could also be settled in cash at the end of the specified period, with a payment of a face amount when there is no default occurring in the specified period as for quarterly contracts.

In an alternative embodiment, and in particular the one illustrated in Table 1, the annual contract may instead be settled in kind (e.g., in exchange for other futures contracts) when its final maturity is within an identified period of time from the present. For example, when the final maturity is three years out, an annual futures contract could be converted into four quarterly futures contracts, one for each of the four quarters leading up to the final maturity date. Thus, the entire series, taken as a whole, may have the same duration as the previously traded futures contract, e.g. one year. In this example, the face amount of the quarterly contract would be equal to the face value of the annual contract.

In an alternative embodiment, the futures contracts for time periods farther than three years out may also be maintained as separate quarterly contracts. For those periods, the PODM may require trading of contracts in blocks of four, one for each quarter of the applicable calendar year. This would achieve a similar effect, without a formal in-kind settlement of annual futures contracts into quarterly ones. In other embodiments as described above, such a restriction could be omitted and only quarterly (or some other time unit) time periods employed for all periods of time for which a futures contract may be specified.

By allowing sale of credit default futures contracts in specified time periods, an institution may hedge when considering entering into a loan transaction with a company. For example, if an institution is considering making a large loan but is concerned about a short-term default event, the institution may make the loan and sell default futures contracts to cover the risk of a short term default. Any increase from the sale price of the contracts would be the net cost of the hedging in the event no default occurs, but in the event of a default, the institution will net the decrease from sale price of the contract, which could provide a hedge in addition to covering the margin between sale price and the face values of any other futures contracts that were sold (i.e., cover the payout for those time periods where no default occurred, either before or after the actual default). Thus, this type of facility can permit institutions to continue to make long-term loans even in the face of fear of short-term default by providing a vehicle for an institution to hedge against short-term default risk.

Trading Indexes

In addition (or instead) to permitting individual credit default futures contracts, a PODM may permit exchange of futures contracts for an index of possible entity default events. An index may, for example, be established to track the default risk of a group of financial institutions. Similarly, an index may be formed from a variety of individual POD futures contracts to correspond to an index on the general probability of default in the market. Indices may be included as part of a PODM, and traded in a fashion similar to the individual contracts described above with reference to Table 1. An example of a set of contract terms and system constraints for an index called High Grade POD Futures Index are included Table 2.

TABLE 2

| Contract Description |
| --- |
| $1,000,000 in face value of default exposure in a specific basket of corporate, government, institutional or financial entities (reference entities) for a specific period. |
| Contract Name |
| "High Grade POD index futures" |
| Pricing Mechanism |
| Prices represent the sum of the index reference entity prices for an individual contract divided by (n) the number of entities. The price will have range of 0 to 100 inclusive. Since the contract size is $1,000,000 the price will be multiplied by $10,000 to obtain the value of the contract. |
| Tick Size |
| Minimum price fluctuations will be .01. A tick of .01 will represent $100 of settlement value. |
| Multiplier |
| $10,000 |
| Contracts Listed |
| Quarterly contracts for three years: March, June, September, December; and annual contracts for 7 additional years: December |
| Last Trading Day |
| For quarterly contracts: The last business day of the settlement month prior to the $21^{st}$ day of that month. For annual contracts: The last business day prior to the $21^{st}$ day of December in the year three years before the contract year |
| Settlement Day |
| The second business day after the $21^{st}$ day of the settlement month which may be postponed until the Exchange is satisfied of the state of the issued entity at close of trade of the contract. |
| Trading Hours |
| Electronic Trading from 6:30 pm to 4:00 pm (New York time) time Sunday to Friday. For expiring contracts last trade on the last trading day will be at 12:00 noon (New York time). |
| Settlement Procedure for Quarterly Contracts |
| Cash settlement. Once the individual POD futures settlement prices have been determined those in the index will be summed and the sum will be divided by the number of entities in the index. The resulting number will be the settlement price which when multiplied by the multiplier will provide the cash settlements to be made |
| Settlement Procedure for Annual Contracts |
| Annual contracts will settle on the delivery date with three years to final maturity. They will settle in kind, with both long and short positions delivering four quarterly equivalent contracts each at the following function of the last traded price of the annual contract in question. Each quarterly contract will be priced at P = (price of annual contract − 100) ÷ 4) + 100. |

In this example, the index corresponds to n different institutions/set of default contracts, each being weighted equally in the index. Thus, the pricing mechanism corresponds to an average price of a futures contract for the applicable time period of each of the n entities in the index. As with POD contracts, changes in index contract prices may be cleared and settled daily. Thus, the profit or loss that a trader incurs on a given day of trading is based upon the change in the index the end of that day. For settlement at maturity, at the end of the quarterly (in this example) period for a quarterly contract, the index is priced and settled as though it were composed of n contracts in the n individual entities—each having a face value in the amount of the face value of the index (here, $1,000,000) divided by the number of entities (here, n).

In this example annual contracts are converted in-kind to quarterly contracts in a manner similar to that described above.

Since an index futures contract is itself a futures contract, the index contract may correspond to various listed individual contracts but it may also be established in the abstract. That is, for example, an index can be created including entities that do not have individual contracts being traded since it is possible for the market to determine a price for the index as a whole and it is possible to settle a contract by ascertaining the default status of an individual entity whether or not the entity happens to also have individual futures contracts listed on the PODM.

In the example of Table 2, the index is linearly weighted; that is, each listed entity contributes the same weight to the index as a whole. In alternative embodiments, the fund could be weighted in some other fashion, e.g., with the weight of one entity included in the index participating in the value (for price and return) more than another.

In the example of Table 2, the face amount, trading times, settlement dates are the same as in Table 1. Some aspects may facilitate trading, such as permitting trading at the same times for a system that includes both indexes and individual entity futures contracts (some systems may include only one or the other). This is not a requirement, however. Similarly, indexes could have different face amounts from each other or from individual futures contracts.

Trading Index Tranches

A PODM may also permit trading of indexes in tranches. In one example, a tranche is a slice of the index corresponding to an order of defaults. For example, the first 0-3% of defaults in an index for the specified time period could be assigned to one (highest risk) tranche. The next 3-10% of the defaults to the next tranche, etc.

In this example, the credit futures contract is divided not just based on number of defaults but also temporally, e.g., a tranche may be sold covering a tranche of risk (e.g., the first 0-3% of defaults in the index) that occur in a specified time period such as a particular quarter. These tranches may also be formed and traded as default futures contracts on a PODM. Table 3 provides one example of set of contract and system specifications for one example of a tranche futures contract.

TABLE 3

Contract Description $1,000,000 in face value of default exposure in a tranche of a named index of probability of default futures.
Contract Name "[Tranche name] on [index name] probability of default futures"
Series:

0%-3%, 3%-10%, 10%-20%, 20%-30%, 30%-100%
Pricing Mechanism

Prices will be quoted will have a range of 0 to 100 inclusive. Since the contract size is $1,000,000 the price will be multiplied by $10,000 to obtain the settlement value.
Tick Size Minimum price fluctuations will be .01. A tick of .01 will represent $100 of settlement value.
Multiplier $10,000
Contract Listed Quarterly contracts for three years: March, June, September, December; and annual contracts for 7 additional years: December
Last Trading Day The last business day of the settlement month prior to the 21$^{st}$ day of that month.
Settlement Day The second business day after the 21$^{st}$ day of the settlement month which may be postponed until the Exchange is satisfied of the state of the issued entity at close of trade of the contract.
Trading Hours Electronic Trading from 6:30 pm to 4:00 pm (New York time) time Sunday to Friday. For expiring contracts last trade on the last trading day will be at 12:00 noon (New York time).
Settlement Procedure Cash settlement. Once the individual POD futures settlement prices have been determined those in the index will be summed and the sum will be divided by the number of entities in the index. The resulting number will be the settlement price on the index contracts. On the tranche contracts the amount of 100 − index price is the loss to be allocated among the tranche contracts. This loss will be first allocated to the lowest tranche (for example the 0-3% tranche) to the degree that it has not been used up in a previous quarter in the same series and to the degree the loss does not exceed the detachment point. Once the detachment point is reached, the next lowest tranche is then TABLE 3-continued attached and so on until all the losses are allocated. Once the loss assigned to a tranche is known the settlement price will equal 100 − the assigned loss.
The settlement price will be multiplied by the multiplier to provide the cash settlement price.
In any quarter, the tranches that are not attached are settled at 100.
Early Settlement:

In any quarter when a tranche reaches its detachment point all contracts of that same tranche for later quarters will immediately settle at 100.
Settlement Procedure for Annual Contracts:

Annual contracts will settle on the delivery date with three years to final maturity. They will settle in kind, with both long and short positions delivering four quarterly equivalent contracts each at the following function of the last traded price of the annual contract in question. Each quarterly contract will be priced at P = (price of annual contract − 100) ÷ 4) + 100.

As for Table 2, the tranche is set up with the same face value, operating times, etc., although this is not intended to be limiting.

While in the embodiments disclosed above, the face value and accompanying multiplier are $1,000,000 and $10,000 respectively, other embodiments may use other face values and multipliers. For example, in one embodiment the face value and multiplier of futures contracts are $100,000 and $1,000 respectively. Further, different futures contracts may use different face values or multipliers and the invention is not limited to any specific face value or multiplier.

Pricing of Tranches

In one embodiment, tranche prices may be modeled as follows. The tranche boundaries represent a percent of losses and may be denoted by $a_m$, m=0, . . . , M, where $a_0$=0% and $a_M$=100%, such that there are M tranches in the structure and the $n^{th}$ tranche accounts for the losses between $a_{n-1}$ and $a_n$, n=1, . . . , M. The realized incremental loss percentage to be allocated among the tranches at each expiration time s may be denoted as $x_s$, s=1, . . . , S so that the cumulative loss percentage of the index at expiration time t may be expressed as $$\sum_{s=1}^{t} x_s.$$

The settlement price of the contract corresponding to the $n^{th}$ tranche that expires at expiration time t is denoted by $P_{n,t}$ and corresponds to the percentage of the tranche interval that was not invaded by the incremental loss between expiration times t-1 and t. It is described by a function $P_{n,t}=f(x_1, \ldots, x_t; a_0, \ldots, a_M)$. This function may be iteratively specified by considering five cases enumerated below.

For each case, assume the cumulative loss percentage at the $t^{th}$ expiration time lies between the tranche boundaries of the $q^{th}$ tranche, such that $$a_{q-1} \le \sum_{s=1}^{t} x_s < a_q,$$

and the cumulative loss percentage up to the (t-1)$^{th}$ expiration period lies between the boundaries of the $p^{th}$ tranche such that $$a_{p-1} \le \sum_{s=1}^{t-1} x_s < a_p,$$

where $p \le q$. Then, the expiration price of the futures contract on the $n^{th}$ index tranche expiring at time t is determined by:

1. If n>q, $P_{n,t}$=100. In other words, at expiration time t, all tranches higher than the $q^{th}$ tranche that expire at time t settle at 100 since the cumulative loss does not invade their range.

2.

$$\text{If } n = q,\ P_{n,t} = \begin{cases} 100 \dfrac{a_n - a_{n-1} - x_t}{a_n - a_{n-1}}, & \text{if } \sum_{s=1}^{t-1} x_s > a_{n-1} \\ 100 \dfrac{a_n - \sum_{s=1}^{t} x_s}{a_n - a_{n-1}}, & \text{if } \sum_{s=1}^{t-1} x_s \le a_{n-1}. \end{cases}$$

The equation used to calculate the percentage of the $n^{th}$ tranche that has not been invaded between the (t-1)$^{th}$ and $t^{th}$ expiration dates depends upon whether the cumulative loss in the previous period had invaded the tranche. If the $n^{th}$ tranche was assigned a loss in the (t-1)$^{th}$ period (top equation), the numerator corresponds to the maximum total loss percentage range of the tranche minus the incremental loss occurring in period t; otherwise if the first time the $n^{th}$ tranche is assigned a loss is in the $t^{th}$ expiration period (lower equation), the numerator can be calculated as the difference between the upper bound of the tranche and the cumulative loss.

3.

$$\text{If } n < q,\ P_{n,t} = \begin{cases} 0, & \text{if } n > p \\ 100 \dfrac{\sum_{s=1}^{t-1} x_s - a_{n-1}}{a_n - a_{n-1}}, & \text{if } n = p. \end{cases}$$

For contracts below tranche q, the expiration price depends on whether the tranche is above or below tranche p, which was the highest tranche to be assigned a loss in period t-1. If the tranche lies between tranches p and q, the expiration value is 0 since its entire range is subsumed by the current period's incremental loss. For contracts on tranche p, the settlement price is 100 times the fraction of the tranche losses previously allocated as of the last period, which therefore cannot be re-allocated this period. (Note that contracts on tranches below the $p^{th}$ tranche that were initially to expire at the end of period t already will have settled, since all future-expiring contracts on a tranche are settled in the period in which the cumulative loss first exceeds the maximum total loss percentage of its upper bound.)

The expiration price of the futures contract on the $n^{th}$ index tranche expiring in future periods (i.e., s>t ) is determined by:
4. If $q>n\geq p$, $P_{n,s}=P_{p,s}=100$. In other words, contracts expiring in future periods on tranches for which the maximum total percentage loss is exceeded during period t have settlement values of 100, since no further losses can be assigned to contracts on these tranches. In this embodiment, these contracts are also settled at time t since their value is known with certainty at that time.
5. All other contracts expiring in future periods that have not been settled early due to excess cumulative losses will have values that are market determined (i.e. for example, a function of the last daily traded price and/or bid-ask prices as per the rules of the exchange). Market prices will depend upon, among other factors, the expected future incremental losses $x_s$, s>t.

The three following examples are provided to illustrate the method. Although not limiting, embodiments of the present inventions shown in these examples include five tranches (n=1, 2, 3, 4, 5) expiring at the end of five periods (s=1, 2, 3, 4, 5). In all three examples, settlement prices are given at each maturity date, (t=1, 2, 3, 4, 5) and the vector of tranche boundaries may be expressed as:

a=[0 3 10 20 30 100], such that tranche n=1 corresponds to the 0-3% cumulative loss level, n=2 to the 3-10% cumulative loss, etc.

EXAMPLE 1

In this first example, small default percentages take out the first tranche and portions of the second tranche over the five periods. Assume the vector of incremental percentage losses is:

x=[0.5 1 0.5 2 3 ].

In this example, the matrices of settlement prices at the end of each period are given in Tables 4 through 8 and may be found using the above algorithm. All tables show the settlement prices ordered by seniority from top to bottom, with the most senior (30-100%) at the top and the most junior (0-3%) at the bottom, and by expiration date from left to right, with contracts expiring in period 1 in the leftmost column and contracts expiring at the end of period 5 in the rightmost column. As such, the number of columns decreases by one each hypothetical period. In all cases, MDDS represents a market determined daily settlement price as explained in the above algorithm.

TABLE 4

| 100 | MDDS | MDDS | MDDS | MDDS |
|---|---|---|---|---|
| 100 | MDDS | MDDS | MDDS | MDDS |
| 100 | MDDS | MDDS | MDDS | MDDS |
| 100 | MDDS | MDDS | MDDS | MDDS |
| 83.33 | MDDS | MDDS | MDDS | MDDS |

Table 4 shows the settlement prices of the contracts expiring in all periods at the end of period 1. In this example, the first tranche absorbs 0.5% of loss assigned to the structure, leaving 2.5%/3% of the tranche unassigned. All other settlement prices are market determined as per the usual daily settlement procedure of the exchange.

TABLE 5

| 100 | MDDS | MDDS | MDDS |
|---|---|---|---|
| 100 | MDDS | MDDS | MDDS |
| 100 | MDDS | MDDS | MDDS |
| 100 | MDDS | MDDS | MDDS |
| 66.67 | MDDS | MDDS | MDDS |

Table 5 shows the settlement prices of the contracts that expire in periods 2 to 5 at the end of period 2. As shown, in this example, the first tranche continues to absorb all of the losses in period 2. After the 1% loss is assigned to the lowest tranche, 2%/3% of the tranche is unassigned. All other settlement prices are market determined as per the usual daily settlement procedure of the exchange.

TABLE 6

| 100 | MDDS | MDDS |
|---|---|---|
| 100 | MDDS | MDDS |
| 100 | MDDS | MDDS |
| 100 | MDDS | MDDS |
| 83.33 | MDDS | MDDS |

Table 6 shows the settlement prices of the contracts that expire in periods 3 to 5 at the end of period 3. As shown, in this example, the first tranche continues to absorb all of the losses and 2.5%/3% of the tranche is unused this period. All other settlement prices are market determined as per the usual daily settlement procedure of the exchange.

TABLE 7

| 100 | MDDS |
|---|---|
| 100 | MDDS |
| 100 | MDDS |
| 85.71 | MDDS |
| 66.67 | 100 |

Table 7 shows the settlement prices of the contracts that expire in periods 4 and 5 at the end of period 5. As shown, in this example, the first tranche absorbs some of the loss; however, this exhausts the 3% maximum loss that can be allocated to the futures contract on this tranche since the cumulative loss now exceeds 3%. In this embodiment, the futures contract on this tranche expiring in period 5 is settled this period with a settlement price of 100. The remainder of the loss, 1%, is assigned to the next lowest tranche, leaving 6%/7% of the loss in the second lowest tranche unassigned. All other settlement prices are market determined as per the usual daily settlement procedure of the exchange.

TABLE 8

| 100 |
|---|
| 100 |
| 100 |
| 57.14 |
| Settled |

Table 8 shows the settlement prices of the contracts that expire in period 5 at the end of period 5. For clarity, the table also shows the contract on the lowest tranche has been settled (in period 4). As shown, the second tranche absorbs all of the losses in this period and 4%/7% of the loss in this contract is unassigned at the end of period 5. At that time, in this example, all contracts on the index mature.

EXAMPLE 2

This example illustrates the case where the loss in the first period exhausts the maximum potential loss of the lowest tranche as well as some boundary cases where the cumulative loss in some intermediate periods corresponds to the lower boundary of tranche q. Assume the vector of incremental default percentages is given by:

x=[5 5 5 5 5].

Tables 9 through 13 illustrate the settlement prices of the contracts at the end of periods 1 through 5 with the same ordering as in example 1.

TABLE 9

| 100 | MDDS | MDDS | MDDS | MDDS |
| 100 | MDDS | MDDS | MDDS | MDDS |
| 100 | MDDS | MDDS | MDDS | MDDS |
| 71.43 | MDDS | MDDS | MDDS | MDDS |
| 0 | 100 | 100 | 100 | 100 |

Table 9 shows the settlement prices of the contracts at the end of period 1. As shown, the incremental loss of 5% exhausts the maximum potential loss of 3% of the lowest tranche. As a result, the contract on this tranche expiring in period 1 settles with a value of 0 and contracts on this tranche expiring in future periods settle at 100 and are settled at the end of period 1. The remaining 2% of incremental loss is assigned to the next lowest tranche, leaving 5%/7% of the loss for the second tranche unassigned and all other settlement prices are market determined as per the usual daily settlement procedure of the exchange.

TABLE 10

| 100 | MDDS | MDDS | MDDS |
| 100 | MDDS | MDDS | MDDS |
| 100 | MDDS | MDDS | MDDS |
| 28.57 | 100 | 100 | 100 |
| Settled | Settled | Settled | Settled |

Table 10 shows the settlement prices of the contracts that expire in periods 2 to 5 at the end of period 2. For clarity, the expired contracts of the lowest tranche are also included in the table. As shown, the second tranche absorbs all of its remaining incremental losses, leaving 2%/7% of the tranche unassigned in period 2. However, this exhausts the tranche and all contracts of the second tranche expiring in future periods are settled at a value of 100 at the end of this period. For calculation purposes, note that at expiration period t=2 the middle tranche is tranche q in the notation of our previous equations, and that its lower boundary is just touched by the cumulative loss. Thus condition 2 of the algorithm correctly gives a settlement price of 100 for this tranche. All other settlement prices are market determined as per the usual daily settlement procedure of the exchange.

TABLE 11

| 100 | MDDS | MDDS |
| 100 | MDDS | MDDS |
| 50 | MDDS | MDDS |
| Settled | Settled | Settled |
| Settled | Settled | Settled |

Table 11 shows the settlement prices of the contracts that expire in periods 3 to 5 at the end of period 3 as well as the settled contracts of the lowest two tranches. As shown, the middle tranche absorbs all of the 5% incremental losses in this period, leaving 5%/10% of the tranche unused. All other settlement prices are market determined as per the usual daily settlement procedure of the exchange.

TABLE 12

| 100 | MDDS |
| 100 | MDDS |
| 50 | 100 |
| Settled | Settled |
| Settled | Settled |

Table 12 shows the settlement prices of the contracts that expire in periods 4 and 5 at the end of period 4 as well as the previously settled contracts of the lowest two tranches. As shown, the middle tranche absorbs all of its remaining loss, and all other middle tranche contracts expire this period with a settlement price of 100. As in Table 10, tranche q (i.e., the fourth tranche) is not assigned a loss, as calculated using condition 2 of the algorithm. All other settlement prices are market determined as per the usual daily settlement procedure of the exchange.

TABLE 13

| 100 |
| 50 |
| Settled |
| Settled |
| Settled |

Table 13 shows the settlement prices of the contracts that expire in period 5 at the end of period 5. As shown, the fourth tranche absorbs all of the incremental loss of the fifth period and thus settles with 5%/10% of its loss allocation unassigned in period 5. Note that all remaining contracts expire at the end of this period.

EXAMPLE 3

In the final example, we demonstrate the situation where the incremental loss in an intermediate period overwhelms a mezzanine tranche. This example also shows that all tranches may experience losses by the last maturity date. The following vector of incremental loss percentages may be used:

x=[1 4 12 27 40].

Tables 14 through 18 provide the settlement prices at the end of periods 1 though 5, ordered as in the previous two examples.

TABLE 14

| 100 | MDDS | MDDS | MDDS | MDDS |
| 100 | MDDS | MDDS | MDDS | MDDS |
| 100 | MDDS | MDDS | MDDS | MDDS |
| 100 | MDDS | MDDS | MDDS | MDDS |
| 66.67 | MDDS | MDDS | MDDS | MDDS |

Table 14 shows the settlement prices of the contracts at the end of period 1. As shown, the incremental loss of 1% is absorbed by the lowest tranche, which settles with 2%/3% unused, and all other settlement prices are market determined as per the usual daily settlement procedure of the exchange.

TABLE 15

| 100 | MDDS | MDDS | MDDS |
| 100 | MDDS | MDDS | MDDS |
| 100 | MDDS | MDDS | MDDS |
| 71.43 | MDDS | MDDS | MDDS |
| 33.33 | 100 | 100 | 100 |

Table 15 shows the settlement prices of the contracts that expire in periods 2 to 5 at the end of period 2. As shown, the incremental loss exhausts the maximum capacity of the lowest tranche and the remainder of the loss is assigned to the second tranche. In particular, 2% of the incremental loss is assigned to the lowest tranche, which settles with 1%/3% unused this period, and 2% of the incremental loss is assigned to the second tranche, which settles with 5%/7% unassigned. In this embodiment, all contracts of the lowest tranche expire at the end of this period at an expiration value of 100 and all other settlement prices are market determined as per the usual daily settlement procedure of the exchange.

TABLE 16

| 100 | MDDS | MDDS |
|---|---|---|
| 100 | MDDS | MDDS |
| 30 | MDDS | MDDS |
| 28.57 | 100 | 100 |
| Settled | Settled | Settled |

Table 16 shows the settlement prices of the contracts that expire in periods 3 to 5 at the end of period 3. The table also includes the previously settled contracts of the lowest tranche. As shown, the incremental percentage loss exhausts the maximum remaining loss of the second tranche of 5% and the middle tranche absorbs the remainder of the incremental percentage loss. Since 5% is assigned to the second tranche, it settles with 2%/7% unallocated in period 3. The middle tranche settles with 3%/10% unallocated as it receives the remaining 7% of the incremental loss for this period. All contracts of the second tranche settle at the end of period 3, with contracts with later initially determined expiration dates settling at 100. All other settlement prices are market determined as per the usual daily settlement procedure of the exchange.

TABLE 17

| 80 | MDDS |
|---|---|
| 0 | 100 |
| 70 | 100 |
| Settled | Settled |
| Settled | Settled |

Table 17 shows the settlement prices of the contracts that expire in periods 4 and 5 at the end of period 5 as well as the settled contracts of the lowest two tranches. As shown, the middle tranche absorbs its remaining portion of the incremental percentage loss, 3%, and its capacity is exhausted. The capacity of the fourth tranche, 10%, is completely exhausted in this period and thus it settles at 0. The remainder of the loss, 14%, is assigned to the most senior tranche, using up 14%/70% of its loss capacity. The futures contracts of the middle and fourth tranches expiring in period 5 are settled at the end of period 4 at a value of 100 and the only remaining contract expiring in period 5 has a settlement price that is market determined as per the usual daily settlement procedure of the exchange.

TABLE 18

| 42.86 |
|---|
| Settled |
| Settled |
| Settled |
| Settled |

Table 18 shows the settlement prices of the one surviving contract that expires in period 5 at the end of period 5 and the settled contracts for the four lower tranches. As shown, the senior layer absorbs all of the incremental loss of the fifth period, leaving 30%/70% of the tranche unassigned in period 5. This contract matures this period.

PODM System Process Diagrams

FIG. 1A provides a context diagram that includes an embodiment of a PODM system 112 and various entities with which the embodiment may interact. The sundry computer systems shown in FIG. 1A, which include personal computing devices 104 and 106, a financial institution system 110, a firewall 114, an order system 118, a clearing system 120 and an auction engine 122, may include one or more computing devices that have at least one processor or controller, memory and an interface. Computer systems and devices are disclosed with further detail with regard to FIG. 10 below.

The PODM system 112 may include a variety of components such as a firewall 114, an order system 118, a clearing system 120 and an auction system 122 interconnected through a private network 116. As shown, the PODM system 112 may interact a variety of external entities, including personal computing devices 104 and 106 and financial institution system 110, via a public network 108. Furthermore, the PODM system 112 may also provide the personal computing devices 104 and 106 with interfaces that enable users, such as futures contract traders 100 and 102, to communicate with the PODM system 112. For example, in one embodiment, the PODM system 112 may serve browser-based interfaces to the personal computing devices 104 and 106 to allow futures contract traders 100 and 102 to place trade requests with the PODM system 112. Futures contract traders 100 and 102 may be entities taking long or short positions or may be representatives of these market participants, e.g. dealers or brokers. To ensure secure transactions, the trade requests may be transmitted through the public network 108 using a variety of security measures including TSL, SSL and/or VPN among other security techniques. The PODM system 112 may serve the user interfaces using any suitable protocol including HTML, DHTML, XML and PHP among others.

Both the public network 108 and the private network 112 may include any communication network through which member computer systems may exchange data. For example, in one embodiment, public network 108 may be a TCP/IP based network employing both wired and wireless connections, such as the Internet. Private network 116 may further restrict member computer systems based on one or more characteristics of each member computer system. For example, private network 116 may restrict member computer systems to only those devices collocated in the same computing facility and/or rack enclosure. Furthermore, while FIG. 1A depicts the communication conduit between entities and components as networks, any form of communication conduit may be used including specialized and/or standard computing bus technologies such as IDE, SCSI, PCI and InfiniBand.

As is discussed further below, in one embodiment, the credit futures contract traders 100 and 102 may authorize a trading session by logging into the order system 118 via personal computing devices 104 and 106. Once the trading session is authorized, the firewall 114 may allow data originating on personal computing devices 104 and 106 to pass into the private network 116. This data may be associated with specific transaction requests, such as requests to trade various credit futures contracts, addressed to the order system 118. After processing the transaction request, the order system 118 may transmit the requested transaction to the auction engine 122 for further handling.

The auction engine 122 may facilitate the completion of transactions by matching potentially countervailing trade requests. Upon finding suitable matches, the auction engine 122 may automatically finalize the matched trade requests and pass the completed transaction to the clearing system 120.

The clearing system 120 may ensure the financial integrity of the market in various ways. For instance, the clearing system 120 may act as an electronic central clearing and settlement agent for a portion or all of the transactions completed by the auction engine 122. In one embodiment, the clearing system 120 may monitor the positions of market participants and the pricing of the various market credit futures contracts. Based on the continual monitoring, the clearing system 120 may issue reports to market participants and may issue margin calls to market participants. In another embodiment, the clearing system 120 may also exchange financial data with financial institution system 110, such as receiving a deposit in response to a margin call.

While FIG. 1A depicts the physical components of the PODM system as separate, distinct computing devices, one of ordinary skill in the art will recognize that each of these components may be implemented in any combination of hardware and/or software, such as a computer system including multiple computing devices. Embodiments implementing these components using a variety of physical configurations exist. For example, in one embodiment, the components of the PODM system may reside on a single computing device.

Figure 1B:
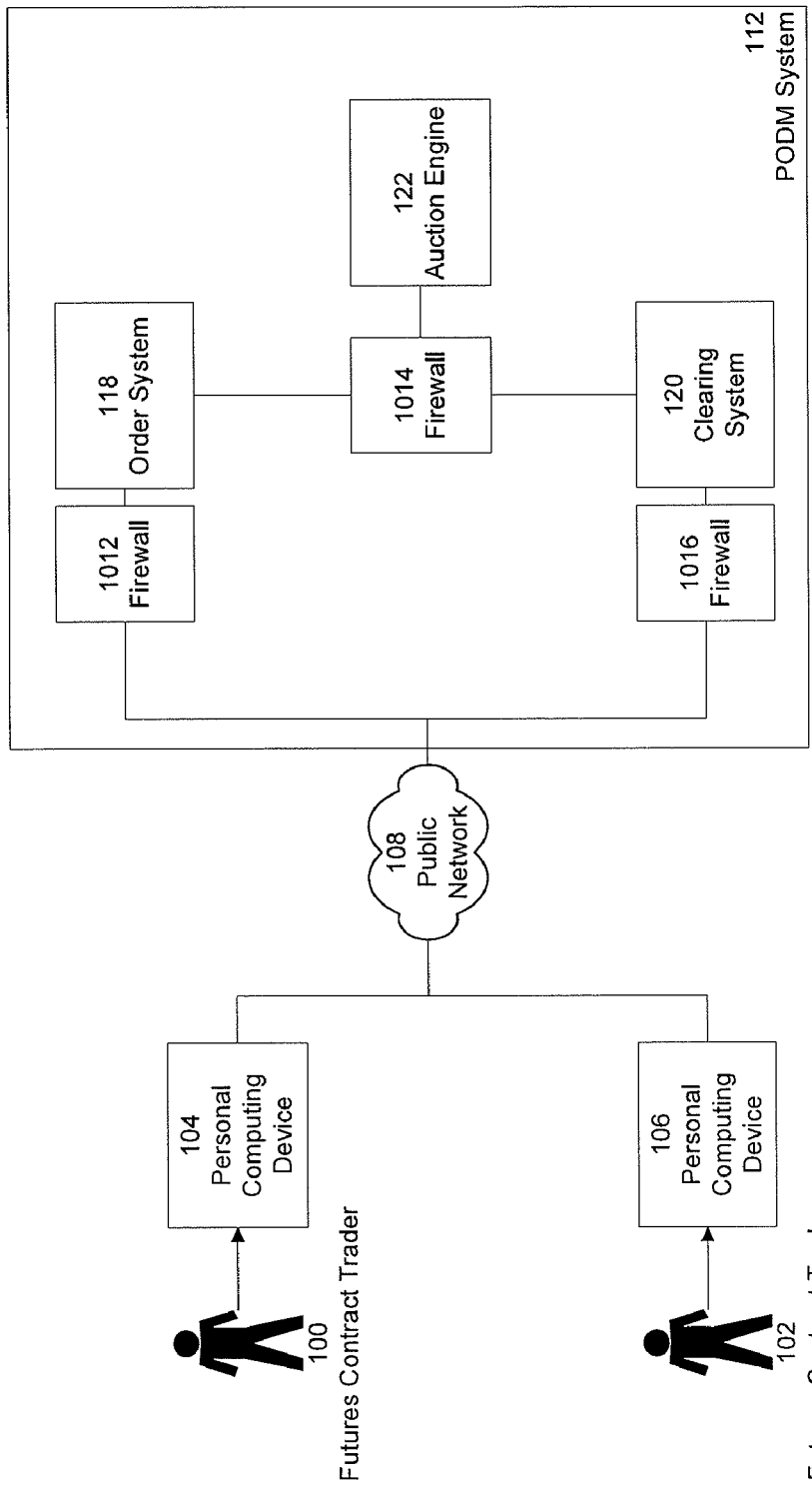
FIG. 1B is a block diagram of another example of a network environment that includes a PODM system.

FIG. 1B illustrates another embodiment in which security is administered via an alternate firewall configuration. More specifically, FIG. 1B incorporates many of the elements of FIG. 1A, but replaces the firewall 114 with firewalls 1012, 1014 and 1016. The firewalls 1012 and 1014 help secure the order system 118 and the clearing system 120 from unauthorized access through the public network 108. As shown, the auction engine 112 benefits from increased protection due to both the presence of the firewall 1014 and the isolated connection of the firewall 1014 with the order system 118 and the clearing system 120. In addition to increased security, this configuration may also support the distribution of these system elements to several different physical locations.

Figure 2:
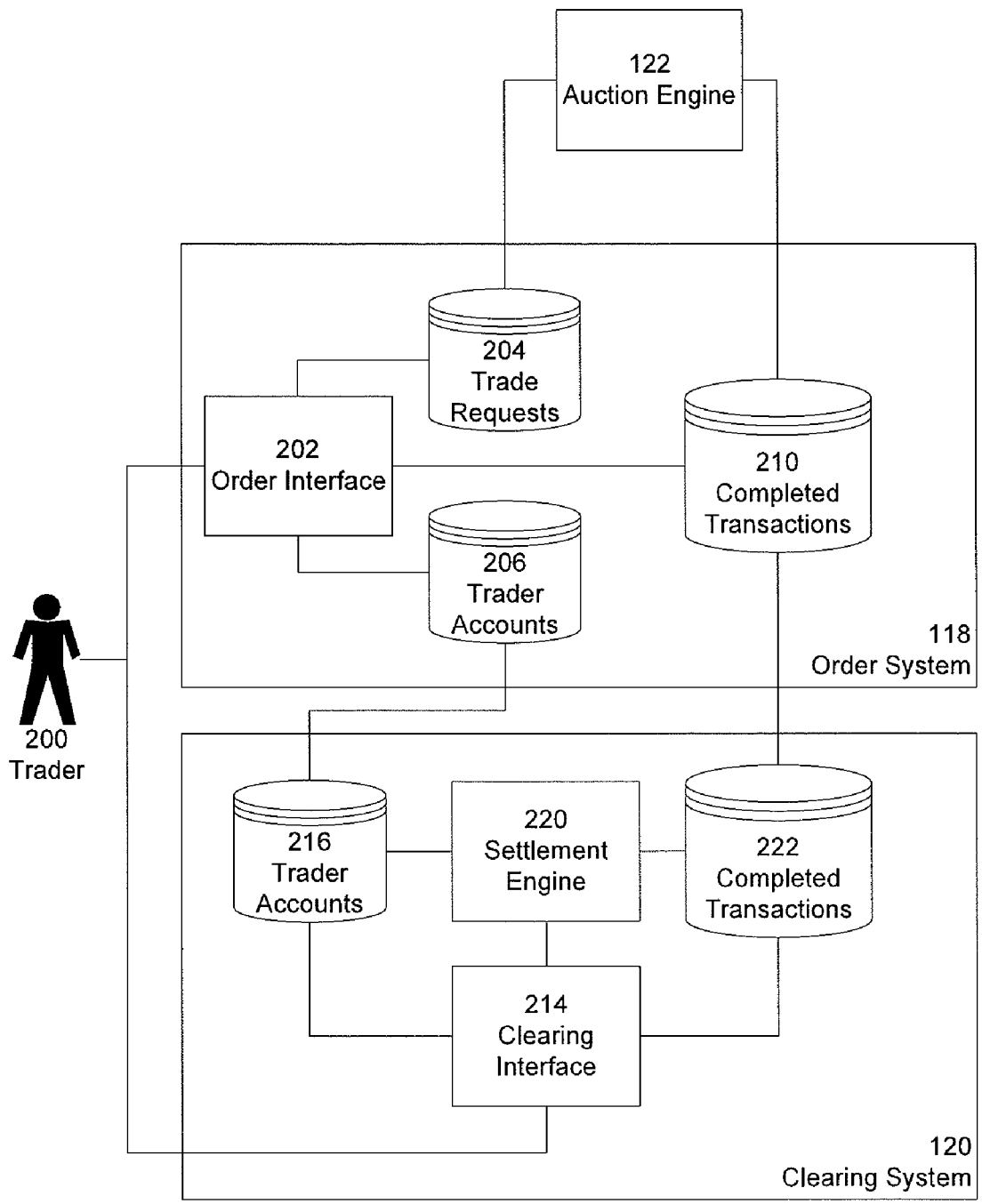
FIG. 2 is a visual representation of a logical architecture of a PODM system according to one embodiment.

FIG. 2 provides a more detailed illustration of the logical elements of one embodiment of a PODM system 112. Any of the system elements shown in FIG. 2 may be implemented in hardware, software or any combination thereof. Software elements may be implemented using customized software code or using existing software including email, FTP, batch system interface, database system data movement tools, middleware, any combination thereof, or otherwise. Moreover, the system structure and content recited below is for exemplary purposes only and is not intended to limit the invention to the specific structure shown in FIG. 2. As will be apparent to one of ordinary skill in the art, many variant system structures can be architected without deviating from the scope of the present invention. The particular modular arrangement presented in FIG. 2 was chosen to promote clarity.

Information may flow between these elements, components and subsystems using any technique known in the art. Such techniques include passing the information over the network via TCP/IP, passing the information between modules in memory and passing the information by writing to a file, database, or some other non-volatile storage device.

As disclosed above, the PODM system 112 may include three primary subsystems, the order entry system 118, the clearing system 120 and the auction engine 122. According to the embodiment depicted in FIG. 2, the order entry system 118 may include an order interface 202, a trade requests database 204, a trader accounts database 206 and a completed transactions database 210. The order interface 202 may receive trader and trade request information and may provide the trader and trade request information to the trade requests database 204 and the trader accounts database 206. The order interface 202 may also receive information regarding completed transactions from the completed transactions database 210 and may provide that information to trader 200. The trade requests database 204 may include information regarding open trade requests including the type of credit futures contract to be traded, the type of trade (buy or sell) and any price restriction information. The trader accounts database 206 may include trader logon credentials, identification and contact information as well as account positions in currency and holdings. These system elements are described in more detail below.

In one embodiment, the order interface 202 may present the trader 200 with less information than conventional credit derivative trading systems. More specifically, as will be discussed further below, embodiments disclosed herein provide for credit futures contracts that employ standardized terms and conditions, such as standard face values, terms, expiration dates and settlement procedures. Consequently, the trader 200 is not required to configure the standard terms and conditions when placing trade requests. This standardization may enable a more streamlined order interface 202 compared to conventional order interfaces.

The order interface 202 may accept user credentials, such as a user identifier and a password, from a trader 200 and authenticate the trader 200 by comparing the user credentials to user information received from the trader accounts database 206. After the trader 200 has been authenticated, the order interface 202 may accept trade requests from the trader 200. In one embodiment, the order interface 202 may validate, using information stored in the trader accounts database 206 or elsewhere, that the trader 200 has sufficient financial resources to complete the trade request prior to storing the trade request in the trade requests database 204. If the trader 200 has insufficient financial resources to complete the trade request, the order interface 200 may notify the trader of his insufficiency. The order interface 200 may also provide facilities for a trader to augment the financial resources he has allocated to trading activity.

In another embodiment, the order interface 202 may also enable the trader 202 to place various price restrictions on trade requests. A non-limiting list of price restrictions includes market orders, limit orders, stop limit orders, stop loss orders, trailing stop loss orders and trailing stop limit orders. Providing for multiple price restriction options enables traders to customize their trade requests to suit their particular needs.

The order interface 202 may present the trader 200 with a choice of credit futures contracts from which to choose when requesting a trade. A non-limiting list of these credit futures contracts may include PODs, POD indexes and POD index tranches. The trader 200 may use the order interface 202 to take long or short positions respective to any of these credit futures contracts. As discussed above, the settlement values of these positions are based on the whether one or more reference entities are in a state of credit default at an identified point in the future. To help provide for a more transparent market for the trader 200, according to one embodiment, the order interface 202 may present credit futures contracts that conform to a standardized set of contract terms and conditions. These terms and conditions may be specific to each type of futures contract and may include, among other contractual attributes, face value, entities referenced, maturation period and settlement procedures.

For example, according to one embodiment, the order interface 202 may present PODs, POD indexes and POD index tranches with face values of $1,000,000 each. In another embodiment the order interface 202 may present PODs and POD indexes that have a face value of $1,000,000 each and may present POD indexes tranches that have a face value of $500,000. The standards enforced by the order interface 202 may also include that the credit futures contract have standard term, for example, quarterly or annual, and that the entity referenced by the POD be any of an identified list of corporate, government, institutional and/or financial entities. With particular regard to POD index tranches, the order interface may present a set of standard tranche series. For instance, in one embodiment, the standard set of tranche series may include 0%-3%, 3%-10%, 10%-20%, 20%-30% and 30%-100%. Furthermore, standard maturity periods for PODs traded by the PODM system 112 may include three years for quarterly contracts and up to an additional seven years for annual contracts.

In one embodiment, the order interface 202 may restrict trading of credit futures contracts after an identified point in time. For example, quarterly contracts may be restricted from trading after the $20^{th}$ day of the settlement month of the quarterly contract. In another embodiment, annual contracts may be restricted from trading after the $20^{th}$ day of December in the year that is three years before the settlement year. As is discussed further below, according to another embodiment, settlement procedures may also be subject to standardization by a settlement engine.

In another embodiment, the order interface 202 may also provide, to the trader 200, market information received from the completed transactions database 210. For example, the order interface 202 may provide the current trading volume and prices of various credit futures contracts traded on the PODM system 112. Additionally, the order interface 202 may provide the view of the PODM as to the probability of default of various reference entities to external entities. Furthermore, the order interface 202 may provide recent historical trading activity regarding PODs sharing a common characteristic, such as a common reference entity.

The order interface 202 may also receive financial data, such as an electronic deposit of cash and/or other liquid instruments. The order interface 202 may update the account balances included in the trader accounts database 206 to reflect any deposits received. Thus, traders are provided with a convenient method of managing account balances.

With continued reference to FIG. 2, as discussed above, the auction engine 122 may match buy and sell trade requests and steward the trade requests into completed transactions. More particularly the auction engine 122 may periodically or continually scan the trade requests database 204 for potentially matching offsetting trade requests, such as, for example, a market buy and a market sell of a POD associated with a particular reference entity. In one embodiment, the auction engine 122 may only actively attempt to complete transactions during an identified time window. For instance, the auction engine 122 may be configured to operate from 6:30 PM to 4:00 PM, Eastern Standard Time, Sunday to Friday of each week. Furthermore, the auction engine may be configured to stop trading of expiring contracts on the last trading day at 12:00 PM, Eastern Standard Time.

Additionally, according to one embodiment, the auction engine may give priority to trade requests with certain characteristics. For example, a market buy may be given priority to a limit buy. Once matching trade requests are determined, the auction engine 122 may record them as complete and insert them into the completed transaction database 210. Completed transactions are settled and cleared by the clearing system 120.

Again referring to FIG. 2, the clearing system 120 may include a clearing interface 214, a trader accounts database 216, a settlement engine 220 and a completed transactions database 222. The completed transactions database 222 may receive data from the completed transactions database 210 by replication or other data transfer methods and may provide transactional information to the settlement engine 220 and the clearing interface 214. The settlement engine 220 may exchange information with the completed transactions database 222, the trader accounts database 216 and the clearing interface 214. The trader accounts database 216 may receive trader account information from the trader accounts database 206 by replication or other data transfer methods. These system elements are discussed further below.

According to one embodiment, the settlement engine 220 may periodically attempt to settle any unsettled transactions included in the completed transactions database 222. The processes used by the settlement engine 220 may vary based, at least in part, on the type of credit futures contract being settled because each type of credit futures contract has different characteristics. For example, as discussed above, the value of a POD is based on the probability of default of a reference entity as determined by the market, while the value of a POD index is based on the values of PODs referencing several entities. According to one embodiment, changes to credit futures contract prices may cause daily settlement. As discussed above, daily settlement causes the changes in futures contract price to be settled to the accounts of owners of long and short positions after each trading day. This practice may help manage risk by ensuring that relatively smaller increments of money are exchanged more frequently, thus limiting the exposure of all participants to a daily amount.

Figure 3:
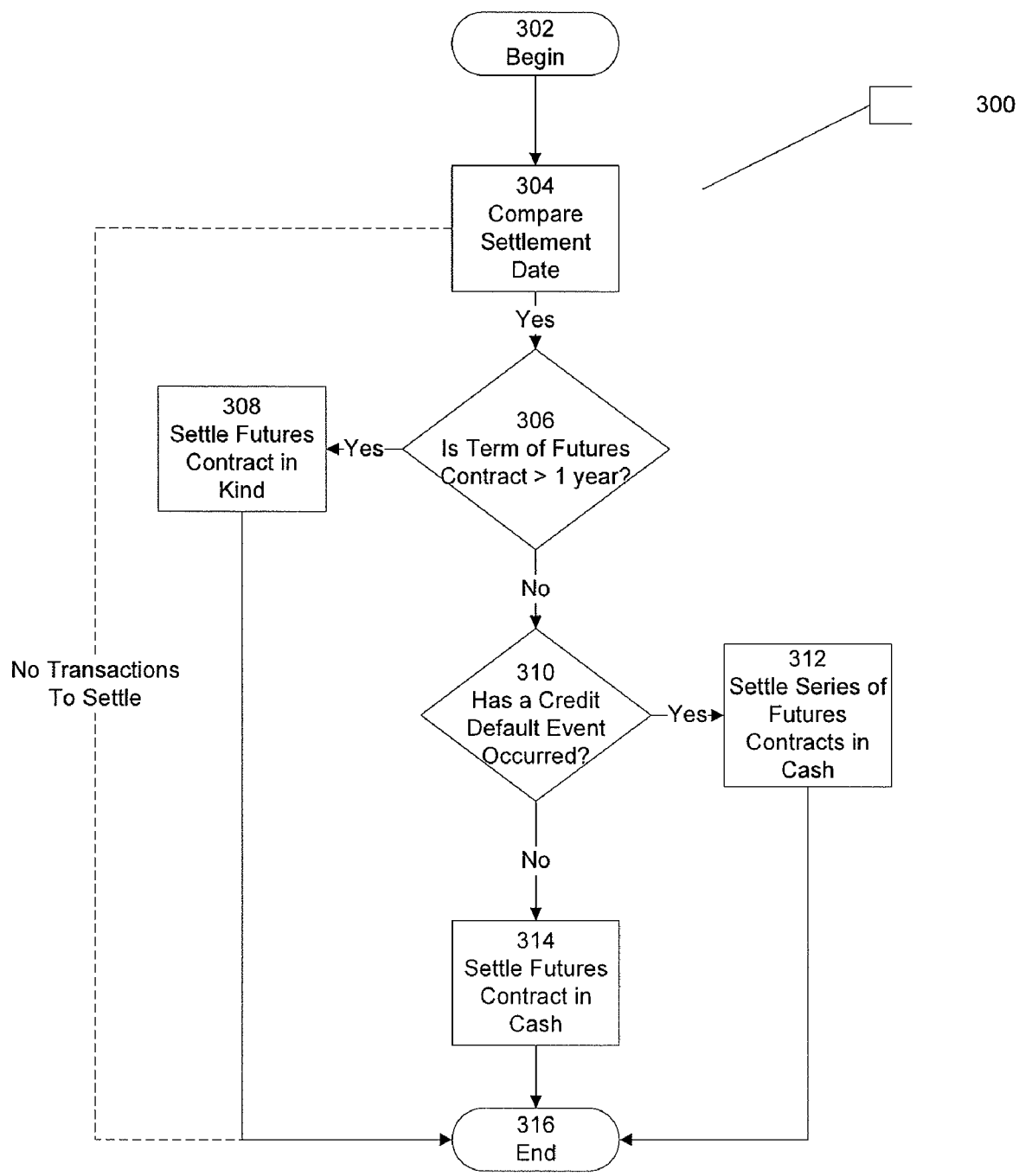
FIG. 3 is a flow chart of a process for settling PODs according to one embodiment.

FIG. 3 illustrates of a process 300 used to settle PODs in kind and at maturity. At block 302, process 300 begins. At block 304, the settlement date of each unsettled transaction may be compared to the current date. In this example, for each unsettled transaction with a settlement date equal to the current date, the method may target that transaction for settlement. If the settlement date of none of the unsettled transactions is the current date, the method progresses to block 316. In one embodiment, the settlement date of each POD is fixed to one of a set of standard settlement dates. For example, PODs may have a settlement date of the second business day after the $21^{st}$ day of a settlement month. For quarterly PODs, settlement months may include March, June, September and December. For annual PODs, the settlement month may be December. Thus the settlement engine breaks up credit exposures into short term exposures, which allows market participants to express their credit market view with greater temporal precision.

At block 306, the term of each POD targeted for settlement may be compared to an identified duration to determine subsequent processing actions. In this example, for each POD targeted for settlement whose term is greater than an identified duration, for example, one year, the method targets that POD for processing by block 308. For each POD targeted for settlement whose term is equal to or less than the identified duration, the method may target that POD for processing by block 310.

At block 308, each POD targeted for processing may be reviewed to determine if the POD has a maturity date equal to an identified date. For example, the identified date may be three years from the current settlement date. If the POD has the identified maturity date, the POD is settled in kind, with short positions delivering long positions on four quarterly equivalent contracts. A system executing block 308 may record this settlement by updating the trader accounts database 216 to reflect the new long and short positions. The quarterly contracts will be priced according to equation (1):

$$P_{Quarterly} = (\text{Last traded price of annual contract} - \text{Face value price of annual contract})/4 + \text{Face value price of quarterly contract} \qquad (1)$$

At block 310, each POD targeted for processing may be reviewed to determine if the entity referenced in the POD is in a credit default state as of 12:00 PM, Eastern Standard Time, on the settlement date. A credit default state may be any indication that an entity may be insolvent. According to one embodiment, an entity is deemed to be in a credit default state if that entity is either bankrupt or insolvent as evidenced by the failure to pay principal payments due on loans or bonds and which payment requirements are beyond their contractual cure period. Each processed POD that references an entity deemed to be in a credit default state may be targeted for processing by block 312. Each processed POD that references an entity deemed to not be in a credit default state may be targeted for processing by block 314.

At block 312, each POD targeted for processing may be settled to $0 cash. All later contracts in the same series, however, may immediately be settled at face value. The act of settling may include updating the trader accounts database 216 to reflect the retirement of the POD and inflow of cash from the settled contracts, if any.

At block 314, each POD targeted for process may be settled for cash face value. The act of settling may include updating the trader accounts database 216 to reflect the retirement of the POD and inflow of cash from the settled POD.

At block 316, process 300 ends.

Figure 4:
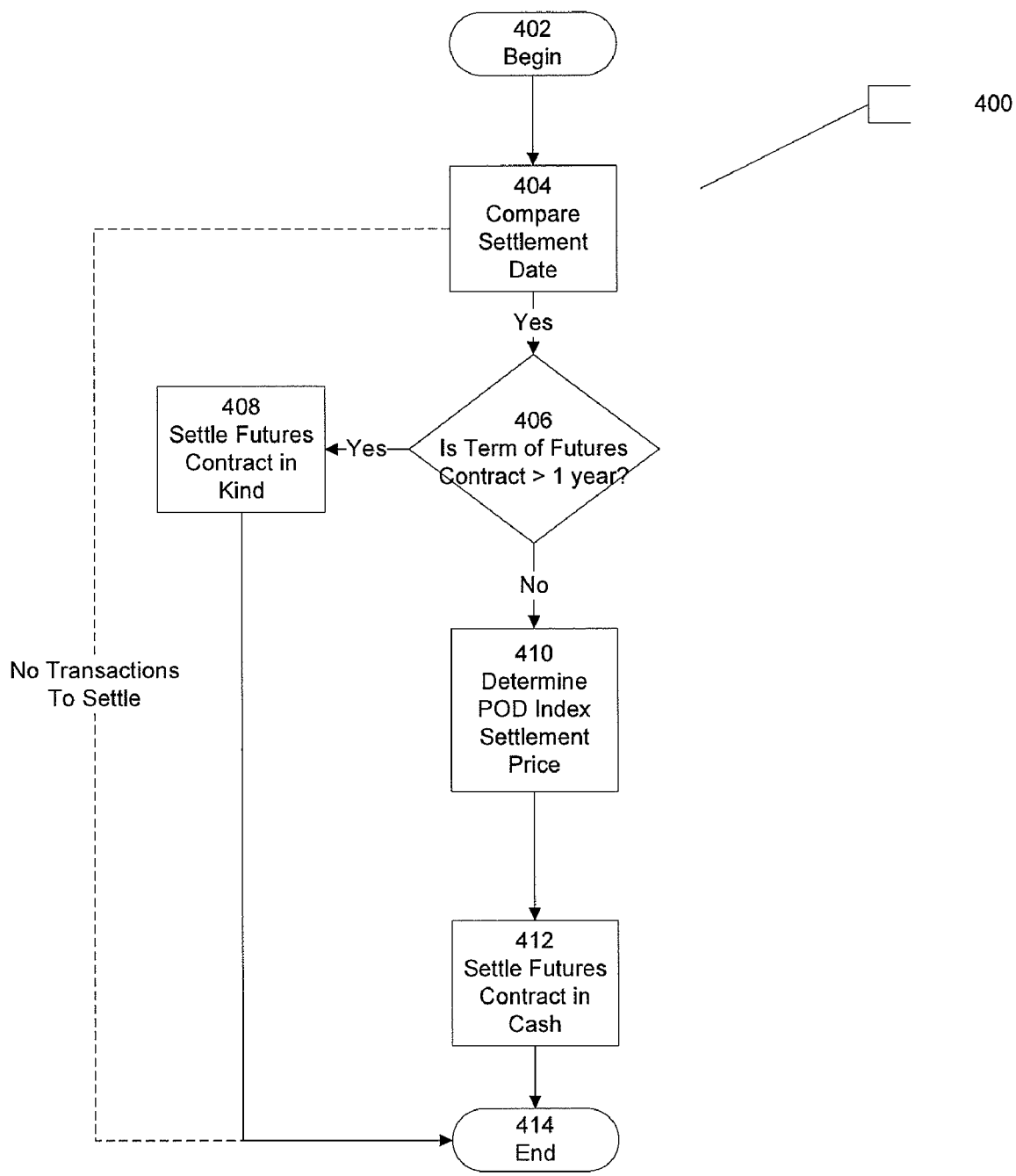
FIG. 4 is a flow chart of a process for settling POD index futures contracts according to another embodiment.

In another embodiment, the settlement engine 220 may settle POD indexes, both daily and at maturity. Daily settlement of POD indexes may be performed based on the change in POD index market value, as discussed above. FIG. 4 illustrates a process 400 used to settle POD indexes in kind and at maturity. At block 402, process 400 begins. At block 404, the settlement date of each unsettled transaction may be compared to the current date. For each unsettled transaction with a settlement date equal to the current date, the method targets that transaction for settlement. If the settlement date of none of the unsettled transactions is the current date, the method progresses to block 414. In one embodiment, the settlement date of each POD index is fixed to one of a set of standard settlement dates. For example, POD indexes may have a settlement date of the second business day after the 21$^{st}$ day of a settlement month. For quarterly POD indexes, settlement months may include March, June, September and December. For annual POD indexes, the settlement month may be December. Thus the settlement engine breaks up credit exposures into short term exposures, which allows market participants to express their credit market view with greater temporal precision.

At block 406, the term of each POD index targeted for settlement may be compared to an identified duration to determine subsequent processing actions. In this example, for each POD index targeted for settlement whose term is greater than an identified duration, for example, one year, the method may target that POD index for processing by block 408. For each POD index targeted for settlement whose term is equal to or less than the identified duration, the method may target that POD index for processing by block 410.

At block 408, each POD index targeted for processing is reviewed to determine if the POD index has a maturity date equal to an identified date. For example, the identified date may be three years from the current settlement date. If the POD index has the identified maturity date, the POD index is settled in kind, with both long and short positions delivering four quarterly equivalent contracts each. A system executing block 408 may record this settlement by updating the trader accounts database 216 to reflect the new long and short positions. The quarterly contracts will be priced according to equation (1):

$$P_{Quarterly} = (\text{Last traded price of annual contract} - \text{Face value price of annual contract})/4 + \text{Face value price of quarterly contract} \qquad (1)$$

At block 410, each POD index targeted for processing may be reviewed to determine all of the PODs that the POD index incorporates. Once the individual settlement prices of all of these PODs have been determined, an average settlement price for these PODs may be calculated. According to one embodiment, this average settlement price may be the POD index settlement price.

At block 412, each POD index targeted for processing may be settled to the POD index settlement price in cash. The act of settling may include updating the trader accounts database 216 to reflect the inflow of cash from the settled contracts, if any.

At block 414, process 400 ends.

Figure 5:
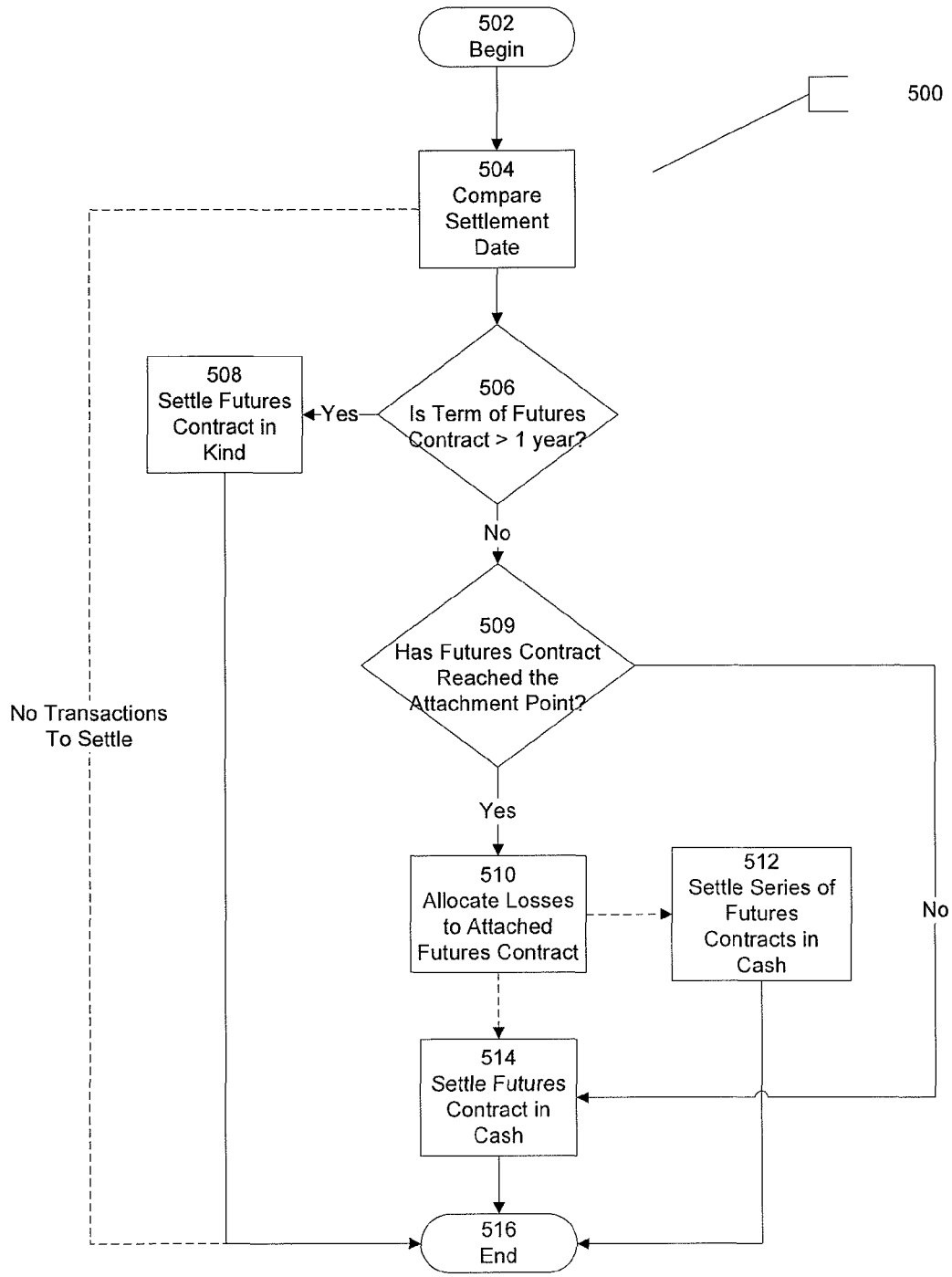
FIG. 5 is a flow chart of a process for settling POD index tranche futures contracts according to another embodiment.

In still another embodiment, the settlement engine 220 may settle POD index tranches daily and at maturity. Daily settlement of POD index tranches may be performed based on the change in the market value of POD index tranches, as discussed above. FIG. 5 illustrates of a process 500 used to settle POD index tranches in kind and at maturity. At block 502, process 500 begins. At block 504, the settlement date of each unsettled transaction may be compared to the current date. For each unsettled transaction with a settlement date equal to the current date, the method targets that transaction for settlement. If the settlement date of none of the unsettled transactions is the current date, the method progresses to block 516. In one embodiment, the settlement date of each POD index tranche is fixed to one of a set of standard settlement dates. For example, POD index tranches may have a settlement date of the second business day after the 21$^{st}$ day of a settlement month. For quarterly POD index tranches, settlement months may include March, June, September and December. For annual POD index tranches, the settlement month may be December. Thus the settlement engine breaks up credit exposures into short term exposures, which allows market participants to express their credit market view with greater temporal precision.

At block 506, the term of each POD index tranche targeted for settlement may be compared to an identified duration to determine subsequent processing actions. In this example, for each POD index tranche targeted for settlement whose term is greater than an identified duration, for example, one year, the method may target that POD index tranche for processing by block 508. For each POD index tranche targeted for settlement whose term is equal to or less than the identified duration, the method may target that POD index tranche for processing by block 509.

At block 508, the maturity date of each POD index tranche targeted for processing is compared to an identified date to determine whether the POD index tranche should be settled in kind. In one embodiment, each POD index tranche targeted for processing is reviewed to determine if the POD index tranche has a maturity date equal to an identified date. For example, the identified date may be three years from the current settlement date. If the POD index tranche has the identified maturity date, the POD index tranche is settled in kind, with both long and short positions delivering four quarterly equivalent contracts each. A system executing block 508 may record this settlement by updating the trader accounts database 216 to reflect the new long and short positions. The quarterly contracts will be priced according to equation (1):

$$P_{Quarterly} = (\text{Last traded price of annual contract} - \text{Face value price of annual contract})/4 + \text{Face value price of quarterly contract} \quad (1)$$

At block 509, each POD index tranche targeted for processing may be reviewed to determine if the POD index tranche has been previously attached. As is discussed further below, a POD index tranche is attached, and losses are allocated to the POD index tranche, when all of the lower POD index tranches, e.g. those tranches with higher risk, have been fully allocated with losses and settled. If the POD index tranche has been previously attached, the method targets that POD index tranche for processing by block 510. If the POD index tranche has not been attached, the method targets that POD index tranche for processing by block 514.

At block 510, each POD index tranche targeted for processing may be allocated losses up to the detachment point of the POD index tranche. Each POD index tranche may be reviewed to determine the settlement price for the POD index referenced by the POD index tranche. A POD index loss calculation may be performed. In one embodiment, the POD index loss may be the difference between the face value of the POD index and the settlement price of the index. The POD index loss may be first allocated to the lowest tranche, for example a 0-3 tranche, to the degree that it has not been allocated to in previous quarters in the same series and to the degree the loss does not exceed the detachment point for the POD index tranche. If the detachment point for the POD index tranche is reached, the POD index tranche may be targeted for processing by block 512 and the next lowest tranche may be attached and the method may repeat until the POD index loss is fully allocated. If the detachment point for the POD index tranche is not reached, the POD index tranche may be targeted for processing by block 514. The settlement price of a POD index tranche is the face value of the tranche minus any POD index loss allocated to the tranche.

At block 512, each POD index tranche targeted for processing may be settled to $0 cash. All later contracts in the same series, however, may immediately be settled at face value. The act of settling may include updating the trader accounts database 216 to reflect the retirement of the POD index tranche and inflow of cash from the settled contracts, if any.

At block 514, each POD index tranche targeted for process may be settled for in cash to the settlement price. The act of settling may include updating the trader accounts database 216 to reflect the retirement of the POD index tranche and inflow of cash from the settled POD index tranche.

At block 516, processes 500 ends.

In another embodiment, the settlement engine 220 may settle the changes in the price of credit futures contracts, prior to maturity, on a more frequent basis. For example, in at least one embodiment, the settlement engine 220 may settle the changes in the price of credit futures contracts on a daily basis. As discussed above, each type of credit futures contract has a particular pricing mechanism. The settlement engine 220 may employ any of these mechanisms and/or others to determine the closing price of each credit futures contract traded each day. The settlement engine 220 may then determine the difference between the price at the end of the previous day and the price at the end of the current day for each credit futures contract. The settlement engine 220 may then update the trader accounts database 216 to reflect inflows or outflows of cash based on the change of the price of each credit futures contract.

Each of processes 300, 400 and 500 depicts one particular sequence of acts in a particular embodiment. Other actions can be added, or the order of actions can be altered in these methods without departing from the scope of the present invention.

Referring again to FIG. 2, the clearing interface 214 may monitor account positions included in the trader accounts database 216 to ensure traders are able to honor their contractual commitments. More specifically, the clearing interface 214 may process completed transaction information retrieved from the completed transactions database 222 to maintain near real-time pricing information regarding the various credit futures contracts traded using the PODM system 112. Furthermore, the clearing interface 214 may access the impact of changing market conditions on trader accounts included within the trader accounts database 216. If changing market conditions will take a trader's account resources below an identified level, the clearing interface 214 may issue a margin call to the trader. In one example, the margin call may be issued to a dealer who, in turn, is responsible to the clearing house for executing the margin call with the entity holding the long or short position. The margin call may use any form of communication including email, fax, pager, POTS and VIOP among others.

The clearing interface 214 may also receive financial data, such as an electronic deposit of cash and/or other liquid instruments, in response to the margin call. The clearing interface 214 may update the account balances included in the trader accounts database 216 to reflect any deposits received. Moreover, the clearing interface may be configured to issue the margin call directly to the financial institution system 110. Thus providing an automated method of replenishing trader account resources as needed.

The clearing interface 214 may also interact with other exchanges. More particularly, the clearing interface 214 may be configured to execute trading strategies in response to changing market conditions and information. For example, in one embodiment the clearing interface 214 may issue a buy order for stock of in a reference entity when the PODM assesses the probability of default for the reference entity to be below a defined level. Similarly, the clearing interface 214 may issue a sell order for the stock of a reference entity when the PODM assess the probability of the reference entity to be above a defined level.

The clearing interface 214 may also perform transaction clearing functions. In one embodiment, for example, the clearing interface 214 may record the long and short positions of market participants after for each completed trade transaction. This record may be made in the trader accounts database 216. Alternatively, the clearing interface 214 may clear a transaction, and record the resulting long and short positions, after ensuring that the buyer's credit is sufficient to limit the risk of default, such as when the buyer is trading on margin.

In one embodiment, the clearing interface 214 may also transfer funds from and to the accounts of holders of long and short positions daily, after daily settlement has been completed. This funds transfer may be made to the trader accounts database 216 or may be made using an interface to a financial institution.

In another embodiment, the clearing interface 214 may perform clearing functions using a central clearing entity as a counterpart to both parties of a transaction. For example, the clearing interface may transfer funds between the holders of long and short positions and the central clearing entity. In another embodiment, the central clearing entity may be a PODM exchange. Use of a central clearing entity may provide market participants with increased confidence that transactions conducted on the exchange will be honored.

The databases 204, 206, 210, 216 and 222 may take the form of any logical construction capable of storing information on a computer readable medium including flat files, indexed files, hierarchical databases, relational databases and/or object oriented databases. The data may be modeled using unique and foreign key relationships and indexes. The unique and foreign key relationships and indexes may be established between the various fields and tables to ensure both data integrity and data exchange performance.

The order interface 202 and the clearing interface 214 each exchange information with various providers and consumers. These providers and consumers may include users and system interfaces. In the exemplary embodiment illustrated in FIG. 2, the trader 200 exchanges information with both the order interface 202 and the clearing interface 214. In an alternative embodiment, this information may be exchanged with other applications or storage media using system interfaces exposed by each of these elements. Each of these elements may both restrict input to a predefined set of values and validate any information entered prior to using the information or providing the information to other components.

Figure 6:
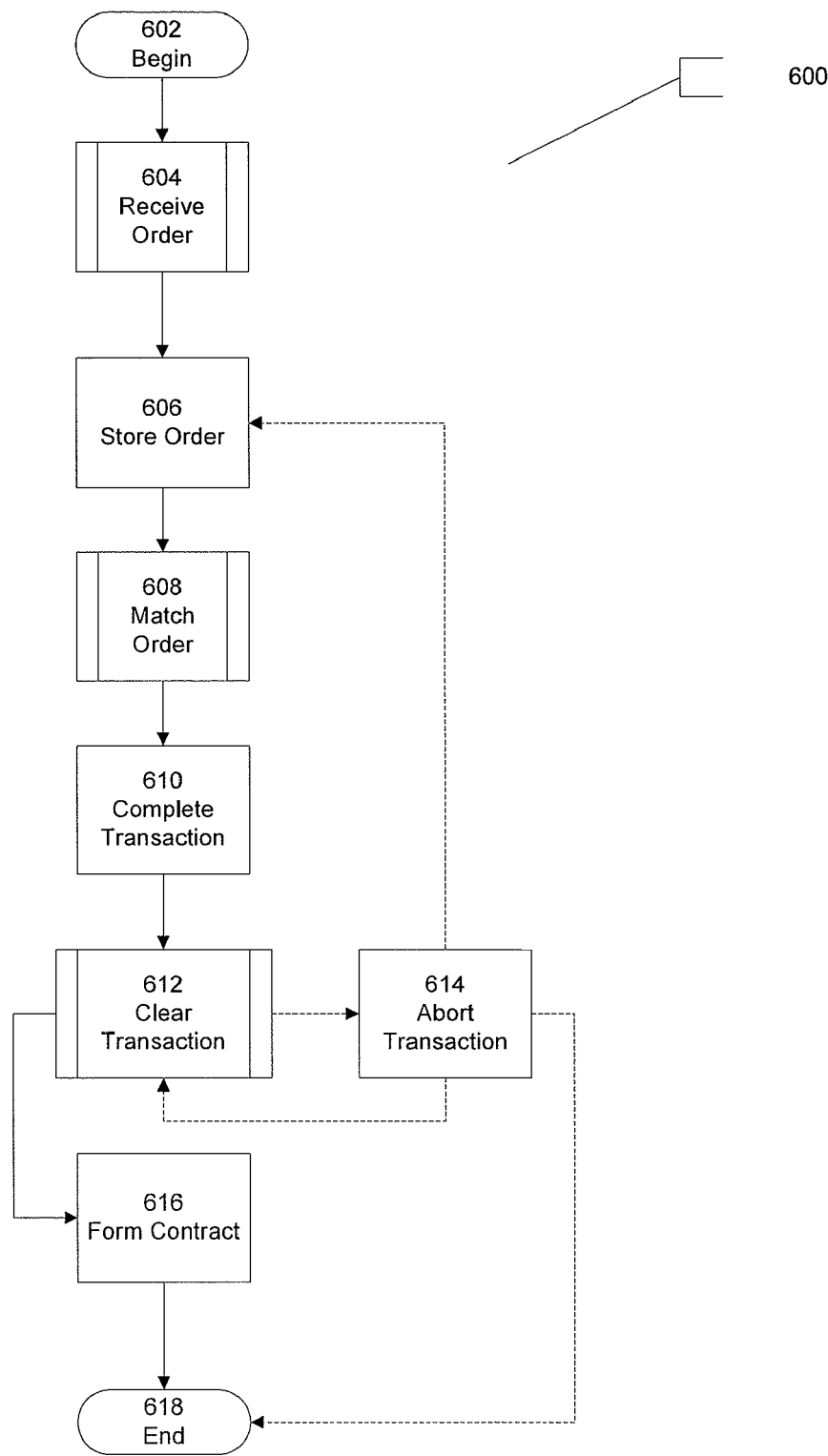
FIG. 6 is flow chart of a process for forming a credit default contract according to another embodiment.

The PODM system 112 may be used to perform various processes in accord with the present inventions. For example, FIG. 6 illustrates one such embodiment, process 600. At block 602, process 600 begins. At block 604, a system executing process 600 receives a trade order. The trade order may be any trade request as discussed above including a request to buy a credit futures contract or a request to sell a credit futures contract. The trade order may be subject to price restrictions, as discussed above. Referring back to FIG. 2, in one embodiment, the system may receive the trade order via the order interface 202.

Figure 7:
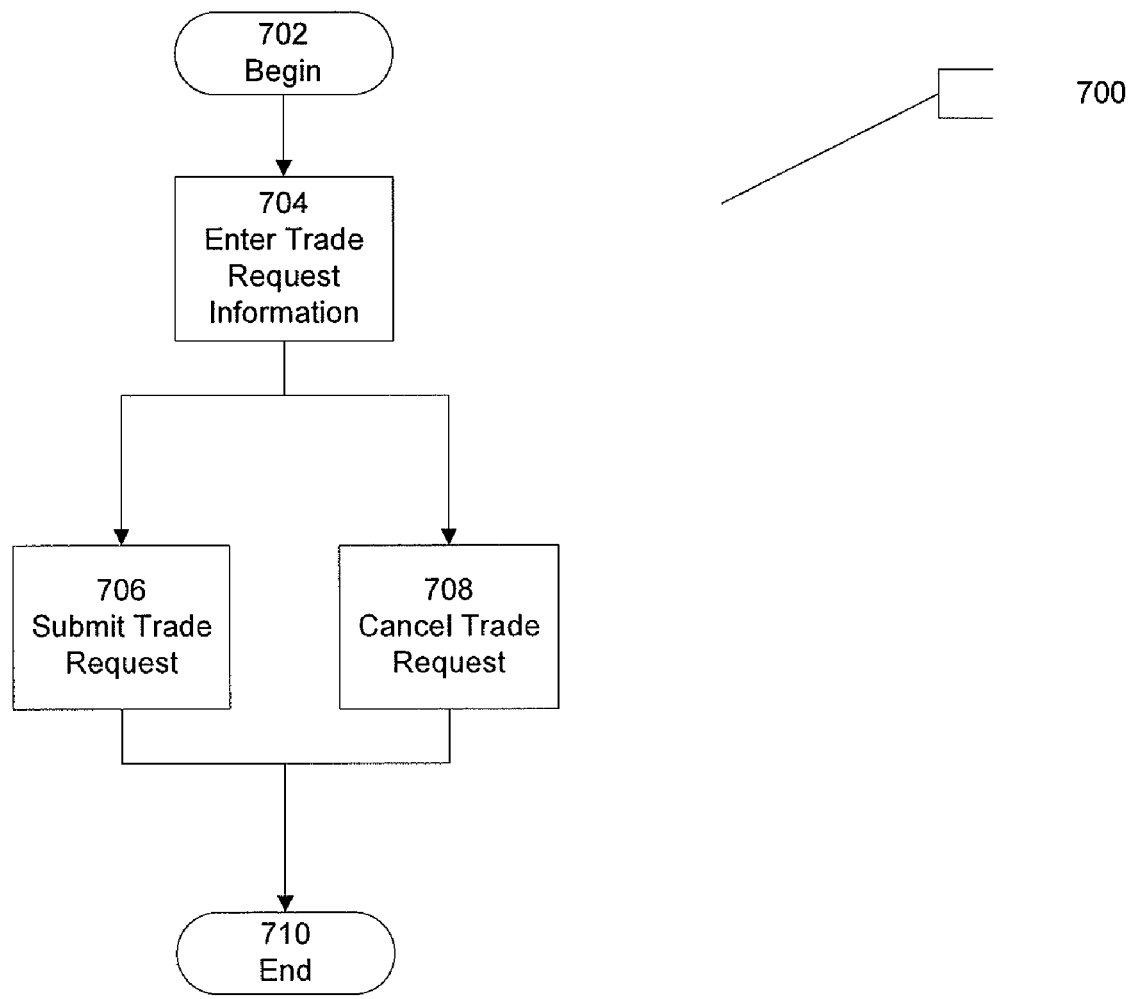
FIG. 7 is a flow chart of a process for receiving trade orders of credit futures contracts according to an embodiment.

More particularly, FIG. 7 shows one embodiment of a process 700 for placing a trade request, by which a system executing process 600 may receive a trade order. At block 702, process 700 begins. At block 704, a trader may enter information required to place a trade into a user interface. This information may include various characteristics of the credit futures contract, including futures contract type (e.g. POD, POD index or POD index tranche), face value, term, entity or entities referenced, tranche series, price restrictions and position sought (long or short) etc. . . . .

At block 706, the trader may submit the trade request by actuating a user interface element designated for submission of trade requests. After the trader submits the trade request, a system executing process 600 may further process the trade request as discussed further below. Alternatively, at block 708, a trader may cancel the trade request by actuating a user interface element designated for cancellation of trade requests. At block 710, process 700 ends.

Referring back to FIG. 6, at block 606, a system executing process 600 stores the order. The system may store the order in any computer readable medium including volatile and nonvolatile memory implemented in magnetic media, optical media or otherwise. Furthermore, the system may store the order in any logical data structure including flat files, indexed files or databases. Referring back to FIG. 2, in one embodiment the system may store the order in the trade requests database 204.

At block 608, a system executing process 600 may match countervailing orders. The system may perform this matching continuously or periodically. As discussed above, in one embodiment, the matching process may actively only during specified time periods, for example 6:30 PM to 4:00 PM, Eastern Standard Time, Sunday to Friday of each week. Referring back to FIG. 2, in one embodiment, the system may match orders using the auction engine 122 and may move completed transactions to the completed transactions database 210.

Figure 8:
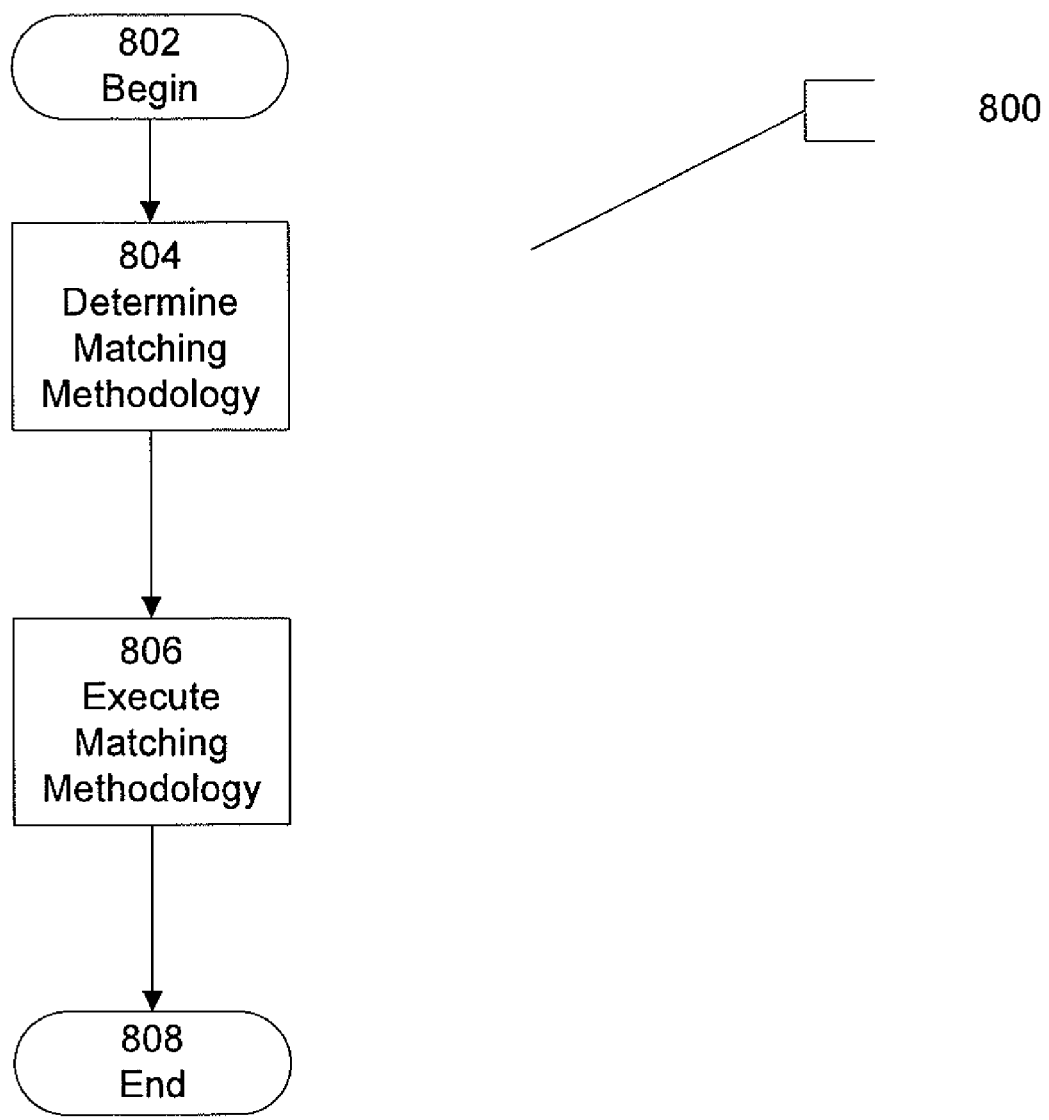
FIG. 8 is a flow chart of a process for matching trade orders of credit futures contacts according to an embodiment.

More particularly, FIG. 8 illustrates one embodiment of a process 800 for matching trade requests. At block 802, process 800 begins. At block 804, a system executing process 800 may determine a matching methodology. In one embodiment, trade requests may be matched continuously and may be given priority on a first-come, first-served basis. In another embodiment, the system may attempt to match all trade requests belonging to by priority group or tier, prior to matching other trade requests. Membership in a tier may be based on any characteristic of trade requests, such as, for example, the price restrictions included in a trade request. For instance, the system may group all market buy and sell orders into a first tier and attempt match the first tier requests prior to identifying and matching other tiers. This embodiment may provide for a more efficient matching process as market buy and sell orders are less restrictive than other types of orders, and thus are more likely to be matched by the system.

Other embodiments may employ other matching methodologies and may combine matching methodologies, for example, one embodiment may use tier based priority matching with first-come, first-served matching within each tier.

At block 806, a system executing process 800 may employ the matching methodology to match offsetting orders based at least in part on any of the characteristics that may vary according to credit futures contract. For example, the system may match based on the futures contract type (e.g. POD, POD index or POD index tranche), face value, term, entity or entities referenced, tranche series and price restrictions. The system may employ indexes into the trade orders while searching for matches. In one embodiment, the system may search using the most statistically discriminating index first, followed by other indexes or sequential searching until a match for the current target trade request is found. Once a match is found, the two offsetting orders may form the basis of a completed transaction. At block 808, process 800 ends.

Referring back to FIG. 6, at block 610, a system executing process 600 may complete a transaction including the matched orders. In one embodiment, a system executing process 600 may complete the transaction by modifying the trade orders to have a "complete" status. In another embodiment, the system may also complete a transaction by removing the orders from their current storage location and placing the orders, or some transformation of them, in the same or a different logical or physical storage location. Referring back to FIG. 2, in one embodiment, the system may complete a transaction by, at least in part, removing the orders that make up the transaction from the trade requests database 204 and storing the completed transaction in the completed transactions database 210.

Figure 9:
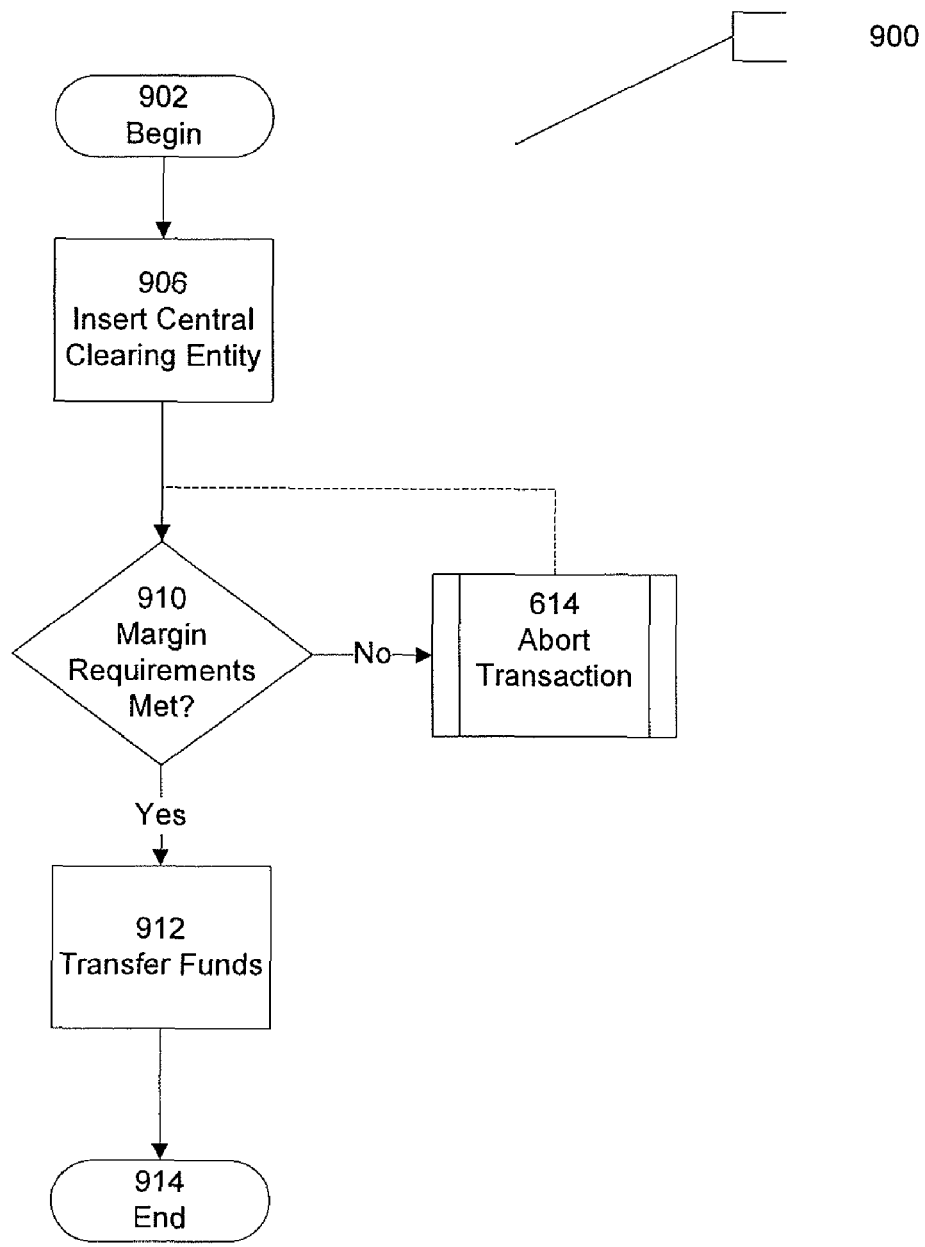
FIG. 9 is flow chart of a process for clearing credit future contract transactions according to an embodiment.

At block 612, a system executing process 600 may clear a transaction. FIG. 9 shows, with more particularity, one embodiment of a process 900 for clearing a transaction. At block 902, process 900 begins. At block 906, the system may insert the central clearing entity as the counterparty for each original party to the transaction. Record of the introduction of a central clearing entity may be made in a database administered by the system, such as completed transactions database 222. As central clearing entities are typically well capitalized institutions, this aspect may provide less risk to each original party.

At block 910, the system may determine if one of the parties to the transaction has sufficient credit and/or holdings within their account to meet margin requirements prior to continuing with the clearing process. These margin requirements may be set by various industry or exchange standards. If the margin requirements are not met, the system may abort the transaction using block 614.

At block 912, a system executing process 900 may clear the transaction by transferring currency from one trading account to another. More specifically, the system may transfer funds to or from the counterparty of the seller to the seller. The system may also transfer funds to or from the buyer to the counterparty of the buyer. Alternatively, the system may clear a transaction by requesting a funds transfer through a user or system interface to a separate financial institution.

At block 914 process 900 ends. Referring back to FIG. 2, in one embodiment, the system clears transactions using the clearing interface 214.

Referring again to FIG. 6, at block 614, a system executing process 600 may abort a transaction. In one embodiment, the system may notify the party that is unable to honor the transaction of its deficiency. The system may request that the deficient party remedy its current state by providing any resources required to complete the transaction, for example by issuing a margin call to the deficient party. As previously discussed, the system may also have replaced the deficient party with another party, such as a central clearing entity, thus enabling partial settlement of the transaction with the non-deficient party. In one embodiment, if the deficient party does meet its margin call obligations, a system executing process 600 may close the deficient party's positions via appropriate trade orders. Referring back to FIG. 2, in one embodiment, the system may abort a transaction using the clearing interface 214.

At block 616, a system executing process 600 forms a contract. In one embodiment, the system forms the contract by recording each party's contractual long and short positions.

At block 618, process 600 ends.

Each of process 600, 700, 800 and 900 depicts one particular sequence of acts in a particular embodiment. Other actions can be added, or the order of actions can be altered in these methods without departing from the scope of the present invention.

Figure 10:
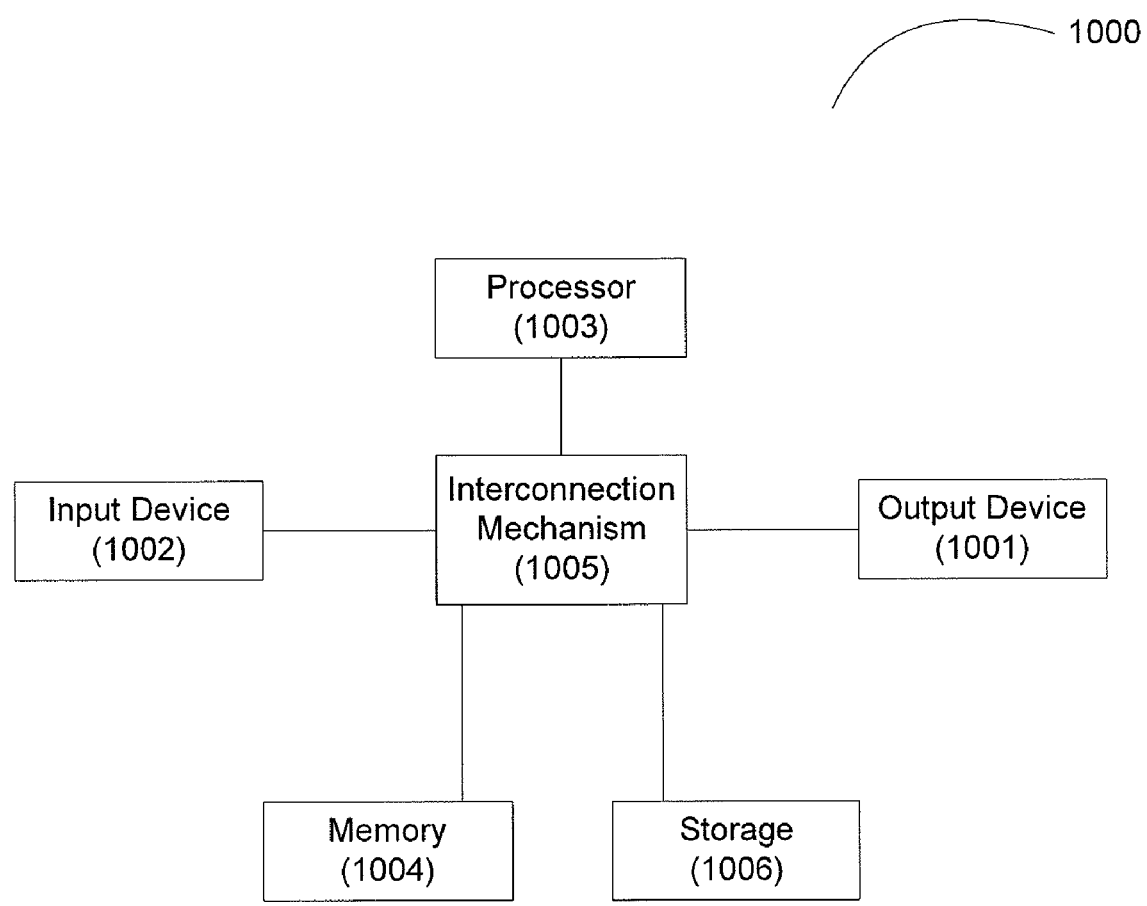
FIG. 10 shows a general-purpose computer system upon which various embodiments may be practiced.

As discussed above, various aspects disclosed herein may be implemented as specialized software executing in a computer system 1000 such as that shown in FIG. 10. Computer system 1000 may include one or more output devices 1001, one or more input devices 1002, a processor 1003 connected to one or more memory devices 1004 through an interconnection mechanism 1005 and one or more storage devices 1006 connected to interconnection mechanism 1005. Output devices 1001 typically render information for external presentation and examples include a monitor and a printer. Input devices 1002 typically accept information from external sources and examples include a keyboard and a mouse. Processor 1003 typically performs a series of instructions resulting in data manipulation. Processor 1003 is typically a commercially available processor such as an Intel Xeon, Itanium, Core, Celeron, or Pentium, AMD Opteron, Sun UltraSPARC, IBM Power5+, or IBM mainframe chip technology, but may be any type of processor. Memory devices 1004, such as a disk drive, memory, or other device for storing data is typically used for storing programs and data during operation of the computer system 1000. Devices in computer system 1000 may be coupled by at least one interconnection mechanism 1005, which may include, for example, one or more communication elements (e.g., busses) that communicate data within system 1000.

Figure 11:
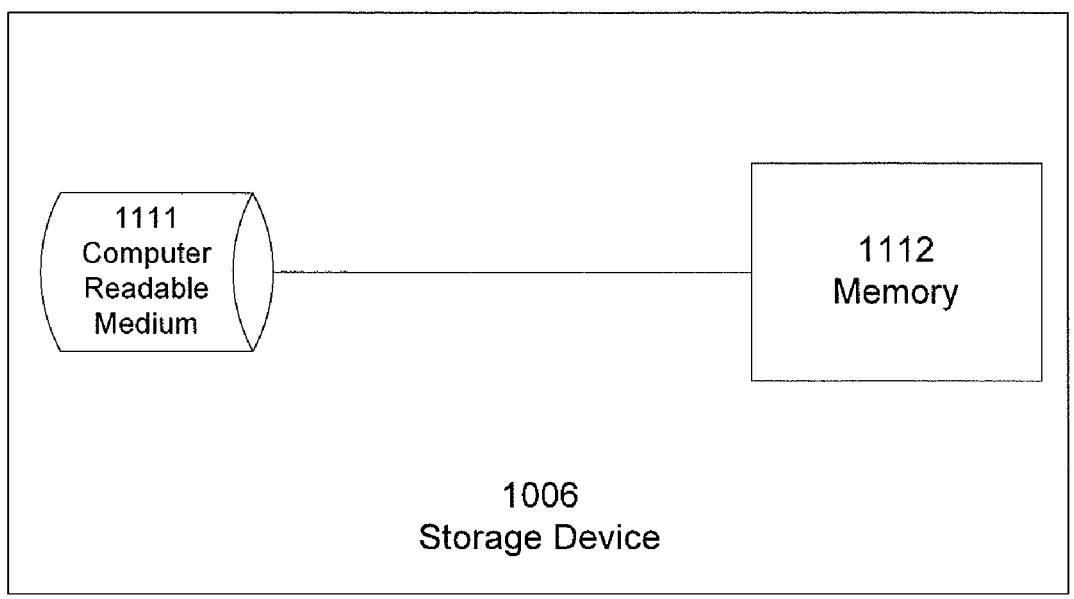
FIG. 11 illustrates a storage device of a general-purpose computer system suitable for implementing various embodiments.

The storage device 1006, shown in greater detail in FIG. 11, typically includes a computer readable and writeable nonvolatile recording medium 1111 in which signals are stored that define a program to be executed by the processor or information stored on or in the medium 1111 to be processed by the program. The medium may, for example, be a disk or flash memory. Typically, in operation, the processor causes data to be read from the nonvolatile recording medium 1111 into another memory 1112 that allows for faster access to the information by the processor than does the medium 1111. This memory 1112 is typically a volatile, random access memory such as a dynamic random access memory (DRAM), static memory (SRAM). Memory 1112 may be located in storage device 1006, as shown, or in memory device 1004. The processor 1003 generally manipulates the data within the memory 1004, 1112 and then copies the data to the medium 1111 after processing is completed. A variety of mechanisms are known for managing data movement between the medium 1111 and the memory 1004, 1112, and embodiments are not limited thereto. Embodiments are not limited to a particular memory device 1004 or storage device 1006.

Computer system 1000 may be implemented using specially programmed, special purpose hardware, or may be a general-purpose computer system that is programmable using a high-level computer programming language. For example, computer system 1000 may include cellular phones, personal digital assistants and/or other types of mobile computing devices. Moreover, a computing device may include any sort of computer such as a personal computer, a workstation, a mainframe, a networked client, a server, media servers and application servers. Computer system 1000 usually executes an operating system which may be, for example, the Windows XP, Windows Vista or other operating systems available from the Microsoft Corporation, MAC OS System X available from Apple Computer, the Solaris Operating System available from Sun Microsystems, or UNIX operating systems available from various sources (e.g., Linux). Many other operating systems may be used, and embodiments are not limited to any particular implementation. For example, an embodiment may process a trade request using a general-purpose computing device with a Sun UltraSPARC processor running the Solaris operating system.

Although computer system 1000 is shown by way of example as one type of computer system upon which various aspects of embodiments may be practiced, it should be appreciated that embodiments are not limited to being implemented on the computer system as shown in FIG. 11. Various aspects of embodiments may be practiced on one or more computer systems having a different architecture or components than that shown in FIG. 11. To illustrate, one embodiment may receive search criteria using several general-purpose computing devices running Windows Vista with Intel processors and several specialized computing devices running proprietary hardware and operating systems.

Figure 12:
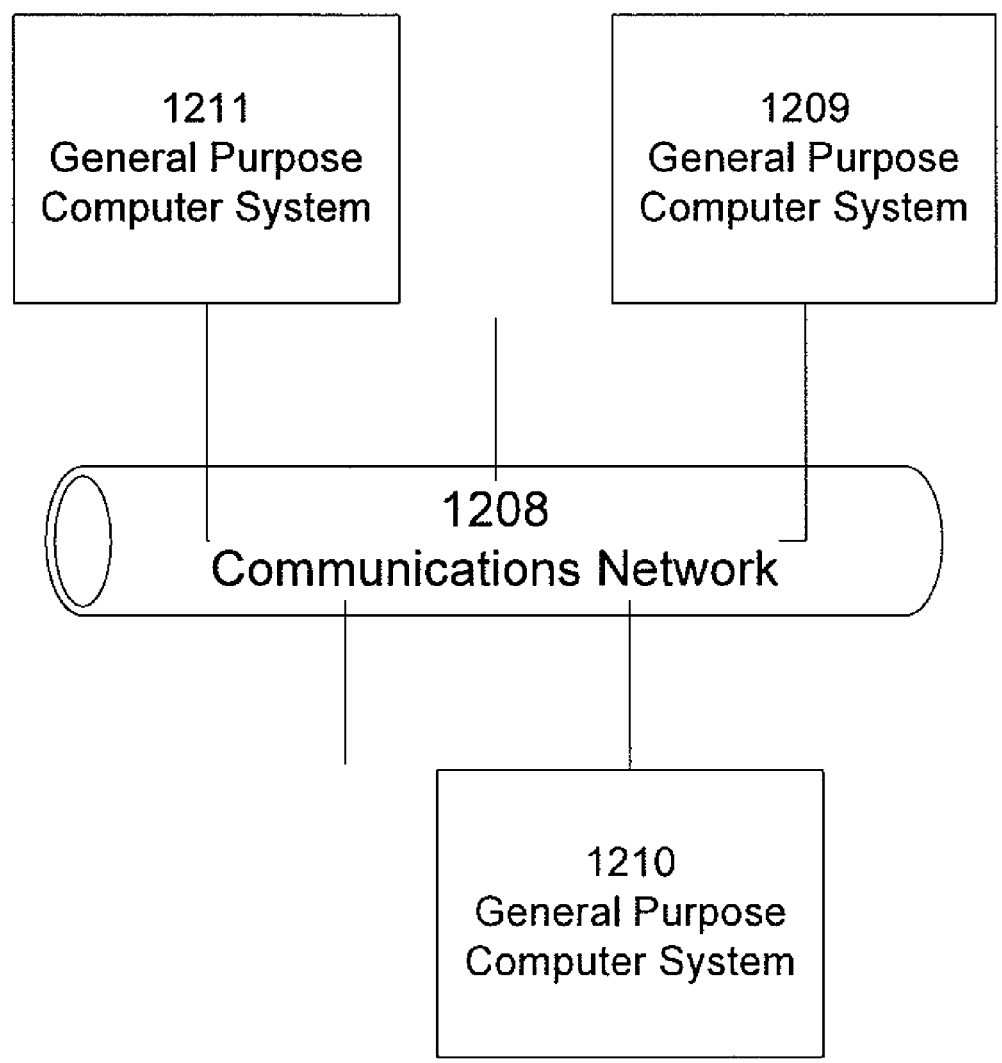
FIG. 12 depicts a network of general-purpose computer systems in which various embodiments may be practiced.

As depicted in FIG. 12, one or more portions of the system may be distributed to one or more computers (e.g., devices 1209-1211) coupled to communications network 1208. These computer systems 1209-1211 may also be general-purpose computer systems. For example, various aspects may be distributed among one or more computer systems configured to provide a service (e.g., servers) to one or more client computers, or to perform an overall task as part of a distributed system. More particularly, various aspects may be performed on a client-server system that includes components distributed among one or more server systems that perform various functions according to various embodiments. These components may be executable, intermediate (e.g., IL) or interpreted (e.g., Java) code which communicate over a communication network (e.g., the Internet) using a communication protocol (e.g., TCP/IP). To illustrate, one embodiment may report market information though a browser interpreting HTML forms and may replicate account balance information using a data translation service running on a separate server.

Various embodiments may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects may be implemented in a non-programmed environment (e.g., documents created in HTML, XML or other format that, when viewed in a window of a browser program, render aspects of a graphical-user interface (GUI) or perform other functions). Various aspects may be implemented as programmed or non-programmed elements, or any combination thereof. For example, an order interface may be implemented using a Microsoft Excel spreadsheet while the auction engine may be written in C++.

It should be appreciated that a general-purpose computer system may perform functions outside the scope of the invention. For instance, aspects of the system may be implemented using an existing commercial product, such as, for example, Database Management Systems such as SQL Server available from Microsoft of Seattle Wash., Oracle Database from Oracle of Redwood Shores, Calif., and MySQL from MySQL AB of UPPSALA, Sweden and WebSphere middleware from IBM of Armonk, N.Y. If SQL Server is installed on a general-purpose computer system to implement an embodiment, the same general-purpose computer system may be able to support databases for sundry applications.

Based on the foregoing disclosure, it should be apparent to one of ordinary skill in the art that the invention is not limited to a particular computer system platform, processor, operating system, network, or communication protocol. Also, it should be apparent that the present invention is not limited to a specific architecture or programming language.

Having now described some illustrative aspects of the invention, it should be apparent to those skilled in the art that the foregoing is merely illustrative and not limiting, having been presented by way of example only. While the bulk of this disclosure is focused on embodiments including futures contracts with a settlement value based on a credit default state that is trigger by a credit default event, other binary reference events may be the basis of future contracts in accordance to the present invention. For example, according to one embodiment, market participants may deal in futures contracts with a binomial settlement value based on the occurrence, or non-occurrence, of an event that damages insured property, such as a hurricane. Similarly, aspects of the present invention may be used to achieve other objectives including allowing insurance companies to hedge against the occurrence of a hurricane in a specific part of the country. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those lo elements may be combined in other ways to accomplish the same objectives. Acts, elements and features discussed only in connection with one embodiment are not intended to be excluded from a similar role in other embodiments.

The invention claimed is:

1. A method for exchanging credit futures contracts comprising:
receiving, by a computer, a first trade order from a first party requesting a long position on a probability of default futures contract (POD), the POD having a reference entity and a maturity date, the POD having first and second potential settlement prices at the maturity date that are predetermined prior to a beginning of a term of the POD;
receiving, by the computer, a second trade order from a second party requesting a short position on the POD;
matching, by the computer, the first trade order with the second trade order;
recording on a computer readable storage medium, a completed transaction, the completed transaction indicating the first trade order, the second trade order, and a traded price;
determining, by the computer, a daily settlement price for the POD for each day of trading of the POD;
determining, by the computer, a daily settlement payment between the first party and the second party based on the daily settlement price;
selecting one of the first and second potential settlement prices to be a final settlement price of the POD, the selecting being performed based at least in part on solvency of the reference entity;
determining, by the computer, a final settlement payment between the first party and the second party based on the final settlement price, the first party and the second party both being obligated to settle the POD at the final settlement price via a payment of the final settlement payment, the final settlement payment being paid by the first party to the second party if the reference entity is insolvent at the maturity date and the final settlement payment being paid by the second party to the first party if the reference entity is solvent at the maturity date; and
recording on a computer readable storage medium, settlement of the POD at the final settlement price.

2. The method according to claim 1, wherein the method further comprises determining whether the first party has sufficient resources to meet a margin requirement for the position requested in the first trade order.

3. The method according to claim 1, the method further comprises recording a clearing house as a counterparty to both the first party and the second party.

4. The method according to claim 1, further comprising settling the POD to 0 when the reference entity is insolvent at the maturity date.

5. The method according to claim 1, further comprising settling the POD to face value when the reference entity is solvent at the maturity date.

6. The method according to claim 1, further comprising settling the POD in kind at a time prior to the maturity date.

7. The method according to claim 6, wherein settling the POD in kind comprises settling the POD in kind based at least in part on a comparison between the maturity date and an identified date.

8. The method according to claim 7, wherein settling the POD in kind comprises settling the POD in kind when a difference between the maturity date and the identified date is 3 years.

9. The method according to claim 6, wherein settling the POD in kind comprises settling the POD into a series of PODs, each of the series of PODs having a reference entity, a maturity date and a final settlement price at the maturity date based at least in part on solvency of the reference entity, none of the series of PODs sharing a common maturity date.

10. The method according to claim 9, wherein settling the POD into the series of PODs comprises settling the POD into a series of PODs, each of the series of PODs having a quarterly maturity date.

11. The method according to claim 9, further compromising settling each of the series of PODs subsequent to one of the series of PODs when the one of the series of PODs settles to 0.

12. The method according to claim 1, wherein the final settlement price is determined to be 0 if the reference entity is insolvent at the maturity date and is determined to be a face value of the POD if the reference entity is solvent at the maturity date.

13. The method according to claim 1, wherein the traded price is (1-(probability of default of the reference entity)) multiplied by a face value of the contract.

14. A method for exchanging futures contracts comprising:
recording, by a computer, on a computer readable storage medium, a completed transaction including;
at least one first trade order from a first party requesting a long position on at least one of a series of probability of default futures contracts (PODs), the series of PODs having a reference entity, each of the PODs specifying a time period that concludes at a maturity date, each of the PODs having first and second potential settlement prices at the maturity date that are predetermined prior to a beginning of a term of the POD, none of the series of futures contracts sharing a common maturity date;
at least one second trade order from a second party requesting a short position on the at least one of the series of PODs; and
a traded price for each of the PODs;
determining, by the computer, for each of the PODs, a daily settlement price for the POD for each day of trading of the POD;
determining, by the computer, for the at least one of the PODs, a daily settlement payment between the first party and the second party based on the daily settlement price;
selecting, for each of the PODs, one of the first and second potential settlement prices to be a final settlement price of the POD, the selecting being performed based at least in part on solvency of the reference entity;
determining, by the computer, for the at least one of the PODs, a final settlement payment between the first party and the second party based on the final settlement price, the first party and the second party both being obligated to settle the POD at the final settlement price via a payment of the final settlement payment, wherein (1) the final settlement payment is paid by the first party to the second party if the reference entity becomes insolvent during the time period specified in the POD, and (2) the final settlement payment is paid by the second party to the first party if the reference entity remains solvent during the time period specified in the POD or if the reference entity became insolvent during a time period preceding the time period specified in the POD; and
recording on a computer readable storage medium, for each of the PODs, settlement of the POD at the final settlement price.

15. The method according to claim 14, wherein recording, on a computer readable storage medium, a completed transaction comprises recording at least one first trade order requesting a long position on a series of PODs and at least one second trade order requesting a short position on the series of PODs.

16. The method according to claim 14, wherein recording, on a computer readable storage medium, a completed transaction comprises recording a long position on a series of probability of default index futures contracts and recording a short position on the series of probability of default index futures contracts.

17. The method according to claim 14, wherein recording, on a computer readable storage medium, a completed transaction comprises recording a long position on a series of probability of default index tranche futures contracts and recording a short position on the series of probability of default index tranche futures contracts.

18. The method according to claim 14, wherein, for each of the PODs, the final settlement price is determined to be 0 if the reference entity is insolvent at the maturity date and is determined to be a face value of the POD if the reference entity is solvent at the maturity date.

19. The method according to claim 14, wherein the traded price is (1-(average probability of default of the reference entities in the index)) multiplied by a face value of the contract.

20. A computer readable medium comprising computer readable instructions that, as a result of being executed by a processor, instruct the processor to perform a method, the method comprising:
receiving, by a computer, a first trade order requesting a long position on a probability of default futures contract (POD), the POD having a reference entity and a maturity date, the POD having first and second potential settlement prices at the maturity date that are predetermined prior to a beginning of a term of the POD;
receiving, by the computer, a second trade order from a second party requesting a short position on the POD;
matching, the computer, the first trade order with the second trade order;
recording, on a computer readable storage medium, a completed transaction, the completed transaction indicating the first trade order, the second trade order, and a traded price;
determining, by the computer, a daily settlement price for the POD for each day of trading of the POD;
determining, by the computer, a daily settlement payment between the first party and the second party based on the daily settlement price;
selecting one of the first and second potential settlement prices to be a final settlement price of the POD, the selecting being performed based at least in part on solvency of the reference entity;
determining, by the computer, a final settlement payment between the first party and the second party based on the final settlement price, the first party and the second party both being obligated to settle the POD at the final settlement price via a payment of the final settlement payment, the final settlement payment being paid by the first party to the second party if the reference entity is insolvent at the maturity date and the final settlement payment being paid by the second party to the first party if the reference entity is solvent at the maturity date; and
recording on a computer readable storage medium, settlement of the POD at the final settlement price.

21. The computer readable medium according to claim 20, wherein the final settlement price is determined to be 0 if the reference entity is insolvent at the maturity date and is determined to be a face value of the POD if the reference entity is solvent at the maturity date.

22. The computer readable medium according to claim 20, wherein the traded price is (1-(probability of default of the reference entity)) multiplied by a face value of the contract.

23. A system for providing a credit futures contract exchange comprising:
a computer;
the computer having computer readable media with instructions stored therein that when executed by the computer cause the computer to implement:
an order interface configured to receive a first trade order from a first party and a second trade order from a second party, the first trade order requesting a long position on a probability of default futures contract (POD), the POD having at least one reference entity and a maturity date, the POD having first and second potential settlement prices at the maturity date that are predetermined prior to a beginning of a term of the POD;
an auction engine configured to match the first and second trade orders and store the first and second trade orders as a completed transaction; and
a settlement engine configured to
determine a daily settlement price for the POD for each day of trading of the POD;
determine a daily settlement payment between the first party and the second party based on the daily settlement price;
select one of the first and second potential settlement prices to be a final settlement price of the POD, the selecting being performed based at least in part on solvency of the reference entity;
determine a final settlement payment between the first party and the second party based on the final settlement price, the first party and the second party both being obligated to settle the POD at the final settlement price via a payment of the final settlement payment, the final settlement payment being paid by the first party to the second party if the reference entity is insolvent at the maturity date and the final settlement payment being paid by the second party to the first party if the reference entity is solvent at the maturity date; and
record, on the computer readable medium, settlement of the POD at the final settlement price.

24. The system according to claim 23, wherein the futures contract comprises at least one of a POD, a probability of default index futures contract and a probability of default index tranche futures contract.

25. The system according to claim 23, wherein the final settlement price is determined to be 0 if the reference entity is insolvent at the maturity date and is determined to be a face value of the POD if the reference entity is solvent at the maturity date.

26. The system according to claim 23, wherein the traded price is (1-(probability of default of the reference entity)) multiplied by a face value of the contract.

27. A method for exchanging an index of credit futures contracts comprising:
receiving, by a computer, a first trade order requesting a long position on the index, the index having an index settlement price based at least in part on a plurality of probability of default futures components (PODs), each of the PODs having a reference entity and a maturity date, each of the PODs having first and second potential POD settlement prices at the maturity date that are predetermined prior to a beginning of a term of the POD;
receiving, by the computer, a second trade order requesting a short position on the index;
matching, by the computer, the first trade order with the second trade order; and
recording, on a computer readable storage medium, a completed transaction, the completed transaction indicating the first trade order, the second trade order, and a traded price;
selecting, for each of the PODs, one of the first and second potential settlement prices to be a final settlement price of the POD, wherein, the first potential settlement price is selected if the reference entity is solvent, and the second potential settlement price is selected if the reference entity is insolvent, the first settlement price being greater than the second settlement price;
determining, by the computer, the index settlement price, the index settlement price being based on the final settlement prices of each of the PODs at the maturity date;
determining, by the computer, a final index settlement payment between the first party and the second party based on the index settlement price, the first party and the second party both being obligated to settle the index at the index settlement price via a payment of the final index settlement payment, wherein (1) the final index settlement payment is owed by the first party to the second party if all of the reference entities are insolvent at the maturity date, (2) the final index settlement payment is owed by the second party to the first party if all of the reference entities are solvent at the maturity date, and (3) if some of the reference entities are solvent and some of the reference entities are insolvent at the maturity date, the final index settlement payment is owed either the first party to the second party or by the second party to the first party, depending on how many of the reference entities are solvent and how many of the reference entities are insolvent; and
recording on a computer readable storage medium, settlement of the index at the index settlement price.

28. The method according to claim 27, further comprising settling the index in kind at a time prior to a maturity date of the index.

29. The method according to claim 28, wherein settling the index in kind comprises settling the index in kind based at least in part on a comparison between the maturing date and an identified date.

30. The method according to claim 29, wherein settling the index in kind comprises settling the index in kind when a difference between the maturity date and the identified date is 3 years.

31. The method according to claim 27, wherein settling the index in kind comprises settling the index into a series of index contracts, each of the series of index contracts having a settlement value based at least in part on a plurality of PODs, none of the series of index contracts sharing a common maturity date.

32. The method of claim 31, wherein settling the index into the series of index contracts comprises settling the index into a series of index contracts, each of the series of index contracts having a quarterly maturity date.

33. The method according to claim 31, further comprising settling each of the series of index contracts subsequent to one of the series of index contracts when the one of the series of index contracts settles to 0.

34. The method according to claim 27, wherein the traded price is (1-(average probability of default of the reference entities in the index)) multiplied by a face value of the contract.

35. A method for exchanging a tranche in an index of credit futures contracts comprising:
receiving, by a computer, a first trade order requesting a long position on the tranche, the tranche having a tranche settlement price based at least in part on an index settlement price of the index, the index settlement price being based at least in part on a plurality of probability of default futures components (PODs), each of the PODs having a reference entity and a maturity date, each of the PODs having first and second potential POD settlement prices at the maturity date that are predetermined prior to a beginning of a term of the POD;

receiving, by the computer, a second trade order requesting a short position on the tranche;

matching, by the computer, the first trade order with the second trade order; and recording, on a computer readable storage medium, a complete transaction, the completed transaction indicating the first trade order, the second trade order, and a traded price;

selecting, for each of the PODs, one of the first and second potential settlement prices to be a final settlement price of the POD, wherein, the first potential settlement price is selected if the reference entity is solvent, and the second potential settlement price is selected if the reference entity is insolvent, the first settlement price being greater than the second settlement price;

determining, by the computer, the index settlement price, the index settlement price being based on the final settlement prices of each of the PODs at the maturity date;

determining, by the computer, the tranche settlement price, the tranche settlement price being based on the index settlement price;

determining, by the computer, a final tranche settlement payment between the first party and the second party based on the tranche settlement price, the first party and the second party both being obligated to settle the tranche at the tranche settlement price via a payment of the final tranche settlement payment, wherein (1) the final tranche settlement payment is owed by the first party to the second party if all of the reference entities are insolvent at the maturity date, (2) the final tranche settlement payment is owed by the second party to the first party if all of the reference entities are solvent at the maturity date, and (3) if some of the reference entities are solvent and some of the reference entities are insolvent at the maturity date, the final tranche settlement payment is owed either the first party to the second party or by the second party to the first party, depending on the configuration of the tranche and depending on how many of the reference entities are solvent and how many of the reference entities are insolvent;

recording on a computer readable storage medium, settlement of the tranche at the tranche settlement price.

36. The method according to claim 35, further comprising settling the tranche in kind at a time prior to a maturity date of the tranche.

37. The method according to claim 36, wherein settling the tranche in kind comprises settling the tranche in kind based at least in part on a comparison between the maturity date and an identified date.

38. The method according to claim 37, wherein settling the tranche in kind comprises settling the tranche in kind when a difference between the maturity date and the identified date is 3 year.

39. The method according to claim 35, wherein settling the tranche in kind comprises settling the tranche into a series of tranche contracts, each of the series of tranche contracts having a settlement value based at least in part on the settlement value of the index, none of the series of tranche contracts sharing a common maturity date.

40. The method according to claim 39, wherein settling the tranche into the series of tranche contracts comprises settling the tranche into a series of tranche contracts, each of the series of tranche contracts having a quarterly maturity date.

41. The method of claim 39, further comprising settling each of the series of tranche contracts subsequent to one of the series of tranche contracts when the one of the series of tranche contracts settles to 0.

42. A method for exchanging a series of probability of default futures contracts comprising:

receiving, by a computer, a first trade order from a first party requesting a long position on at least one of the series of probability of default futures contracts (PODS), the series of PODs having a duration substantially equivalent to a duration of a previously traded futures contract, each of the PODs specifying a time period that concludes at a maturity date, each of the PODs having first and second potential settlement prices at the maturity date that are predetermined prior to a beginning of a term of the POD, none of the series of futures contracts sharing a common maturity date;

receiving, by the computer, a second trade order requesting a short position on the at least one of the series of PODs;

matching, by the computer, the first trade order with the second trade order; and recording, on a computer readable storage medium, a competed transaction, the completed transaction indicating the first trade order, the second trade order, and a traded price;

determining, by the computer, for each of the PODs, a daily settlement price for the POD for each day of trading of the POD;

determining, by the computer, for the at least one of the PODs, a daily settlement payment between the first party and the second party based on the daily settlement price;

selecting, for each of the PODs, one of the first and second potential settlement prices to be a final settlement price of the POD, the selecting being performed based at least in part on solvency of the reference entity;

determining, by the computer, for the at least one of the PODs, a final settlement payment between the first party and the second party based on the final settlement price, the first party and the second party both being obligated to settle the POD at the final settlement price via a payment of the final settlement payment, wherein (1) the final settlement payment is paid by the first party to the second party if the reference entity becomes insolvent during the time period specified in the POD, and (2) the final settlement payment is paid by the second party to the first party if the reference entity remains solvent during the time period specified in the POD or if the reference entity became insolvent during a time period preceding the time period specified in the POD; and recording on a computer readable storage medium, for each of the PODs, settlement of the POD at the final settlement price.

43. The method according to claim 42, wherein receiving a first trade order comprises receiving a first trade order requesting a long position on at least one of the series of futures contracts, each of the series of futures contracts having a quarterly maturity date.

44. The method according to claim 42, wherein, for each of the PODs, the final settlement price is determined to be 0 if the reference entity is insolvent at the maturity date and is determined to be a face value of the POD if the reference entity is solvent at the maturity date.

* * * * *